Fig. 3.

April 24, 1934.   A. L. SALTZMAN   1,955,764
WINDING MACHINE
Filed May 22, 1930   23 Sheets-Sheet 5

INVENTOR
Auguste L. Saltzman.
BY
Emery, Booth, Varney & Whittemore
ATTORNEYS

April 24, 1934.  A. L. SALTZMAN  1,955,764
WINDING MACHINE
Filed May 22, 1930    23 Sheets-Sheet 9

INVENTOR
Auguste L. Saltzman.
BY
Emery, Booth, Varney & Whittemore
ATTORNEYS

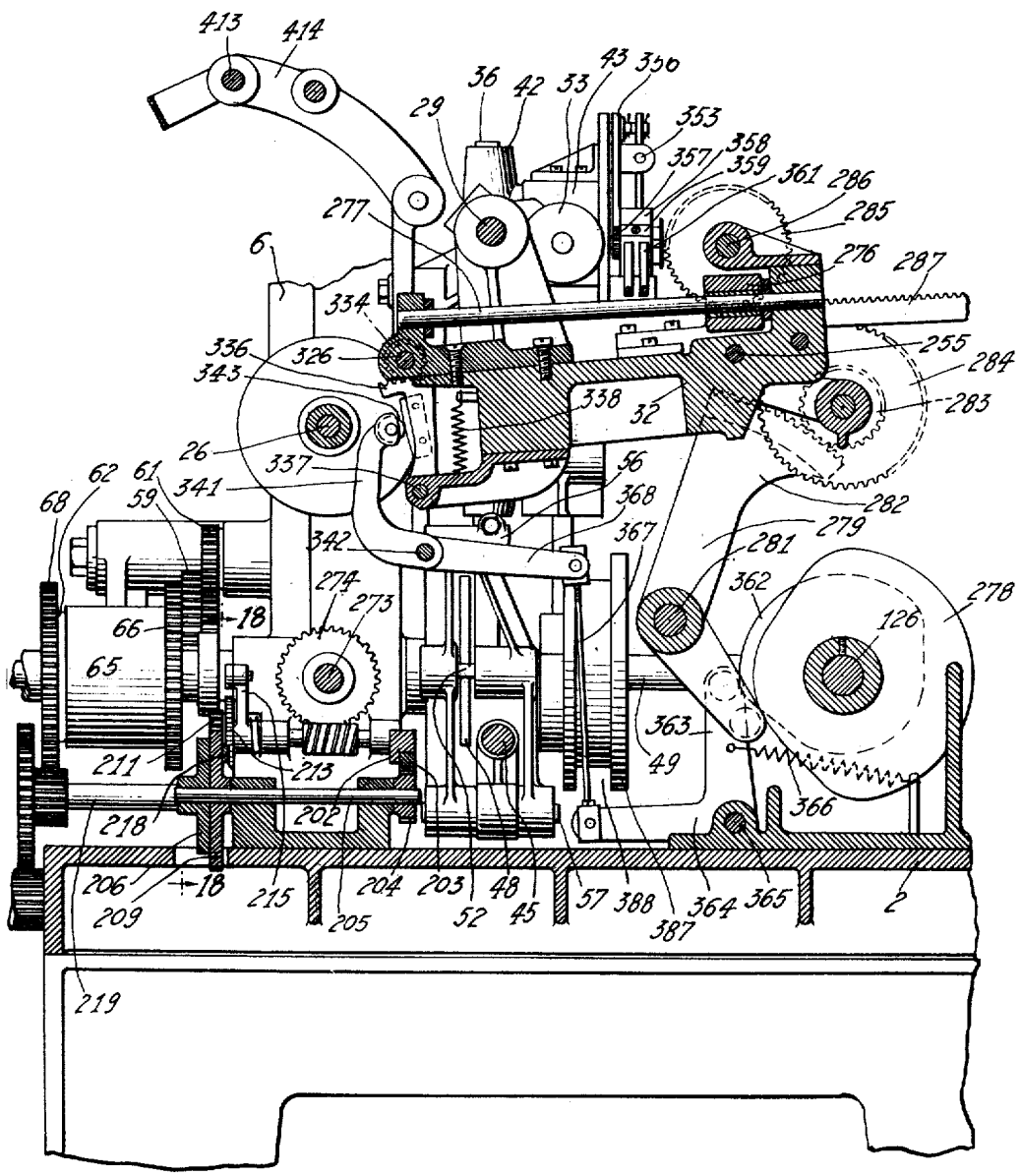

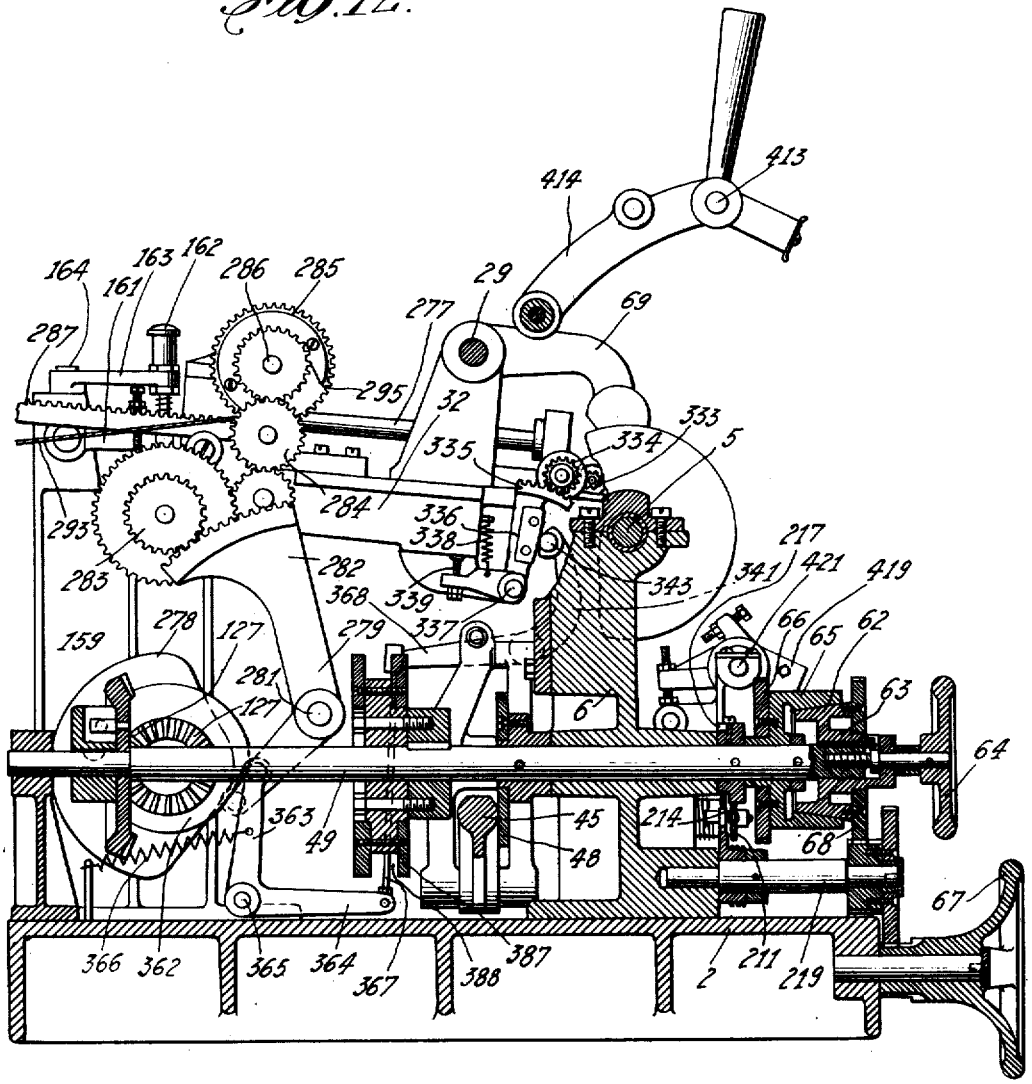

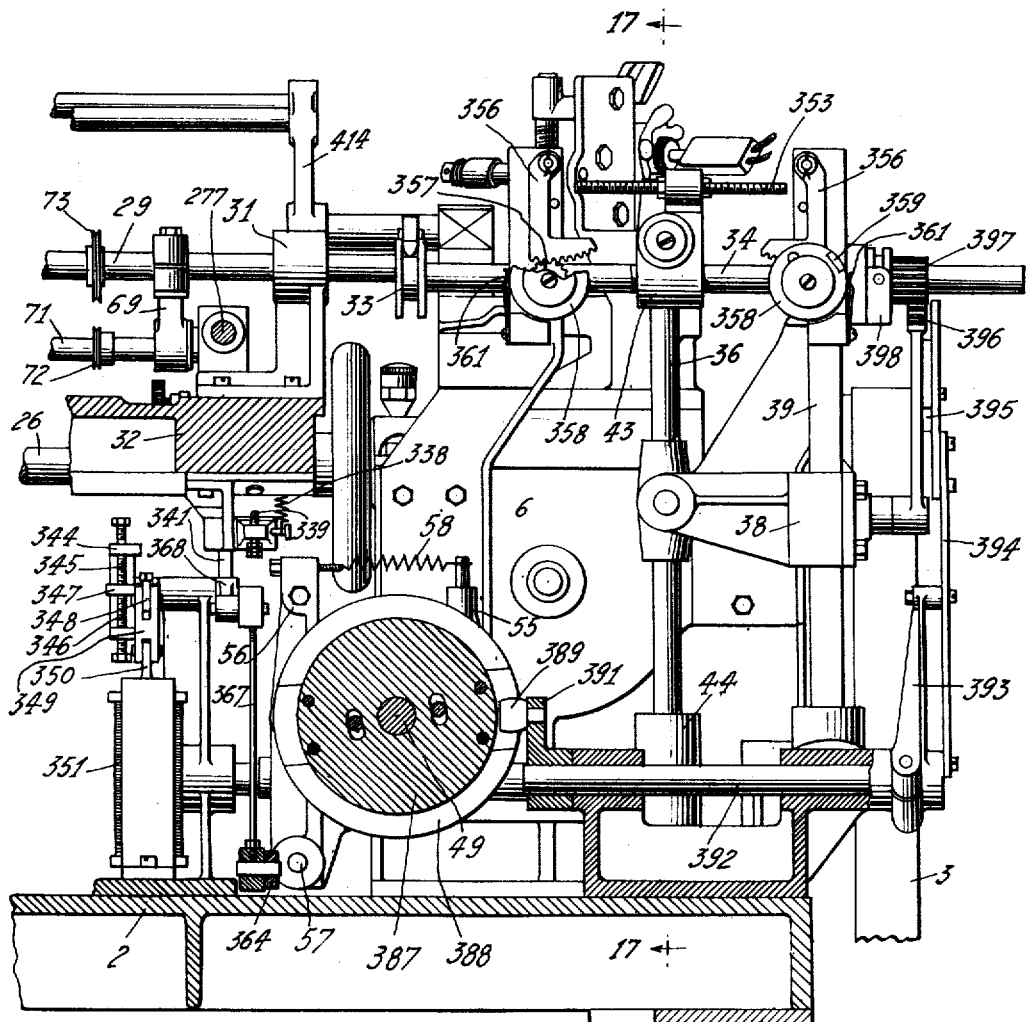

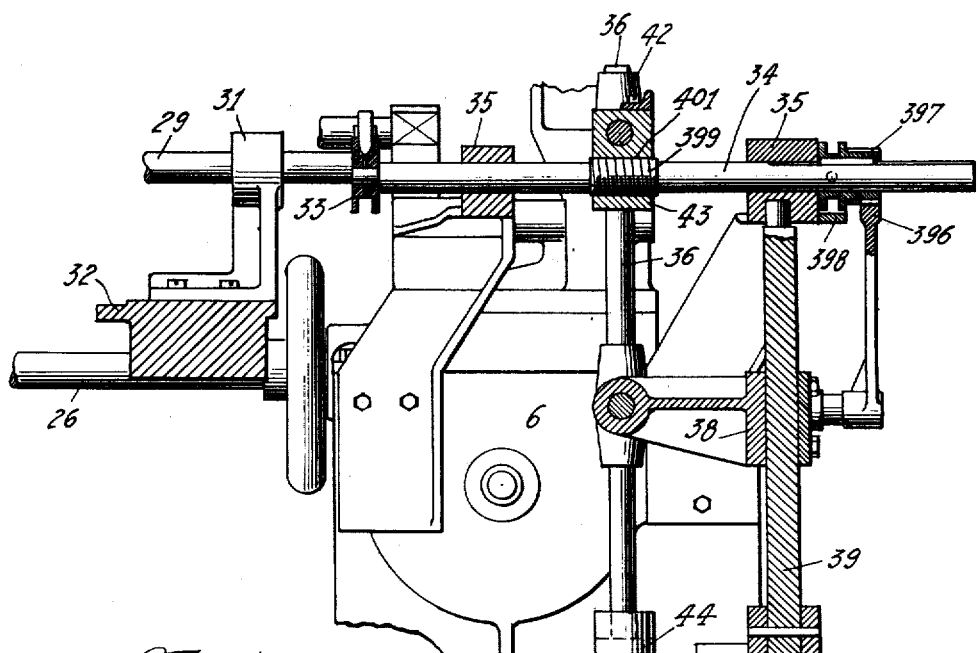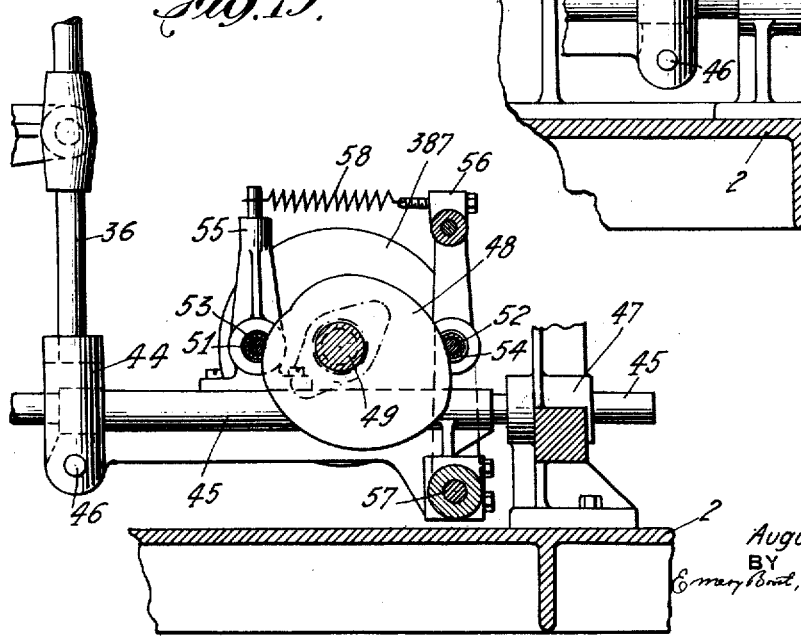

April 24, 1934.  A. L. SALTZMAN  1,955,764
WINDING MACHINE
Filed May 22, 1930  23 Sheets-Sheet 14

Fig. 16.

INVENTOR
Auguste L. Saltzman.
BY
Emery, Booth, Varney & Whittemore
ATTORNEYS

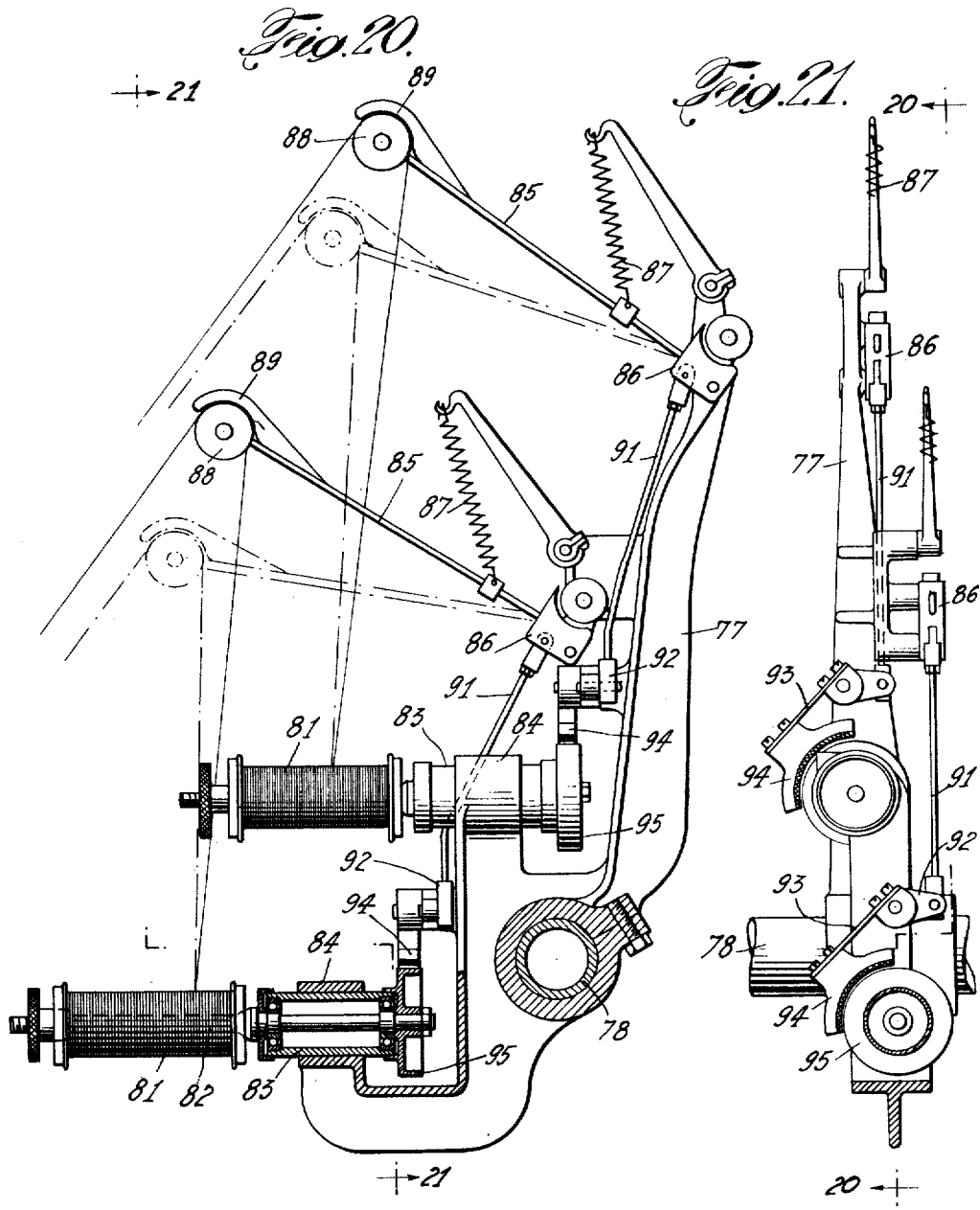

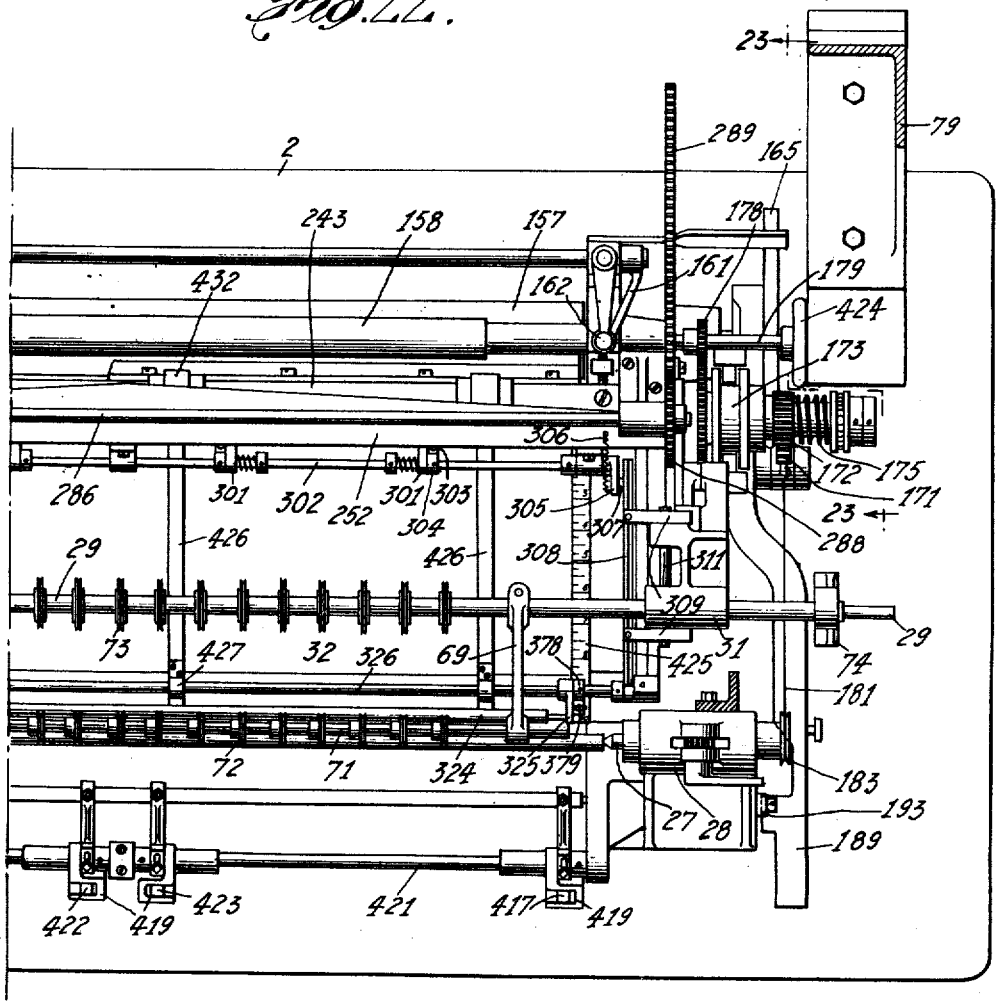

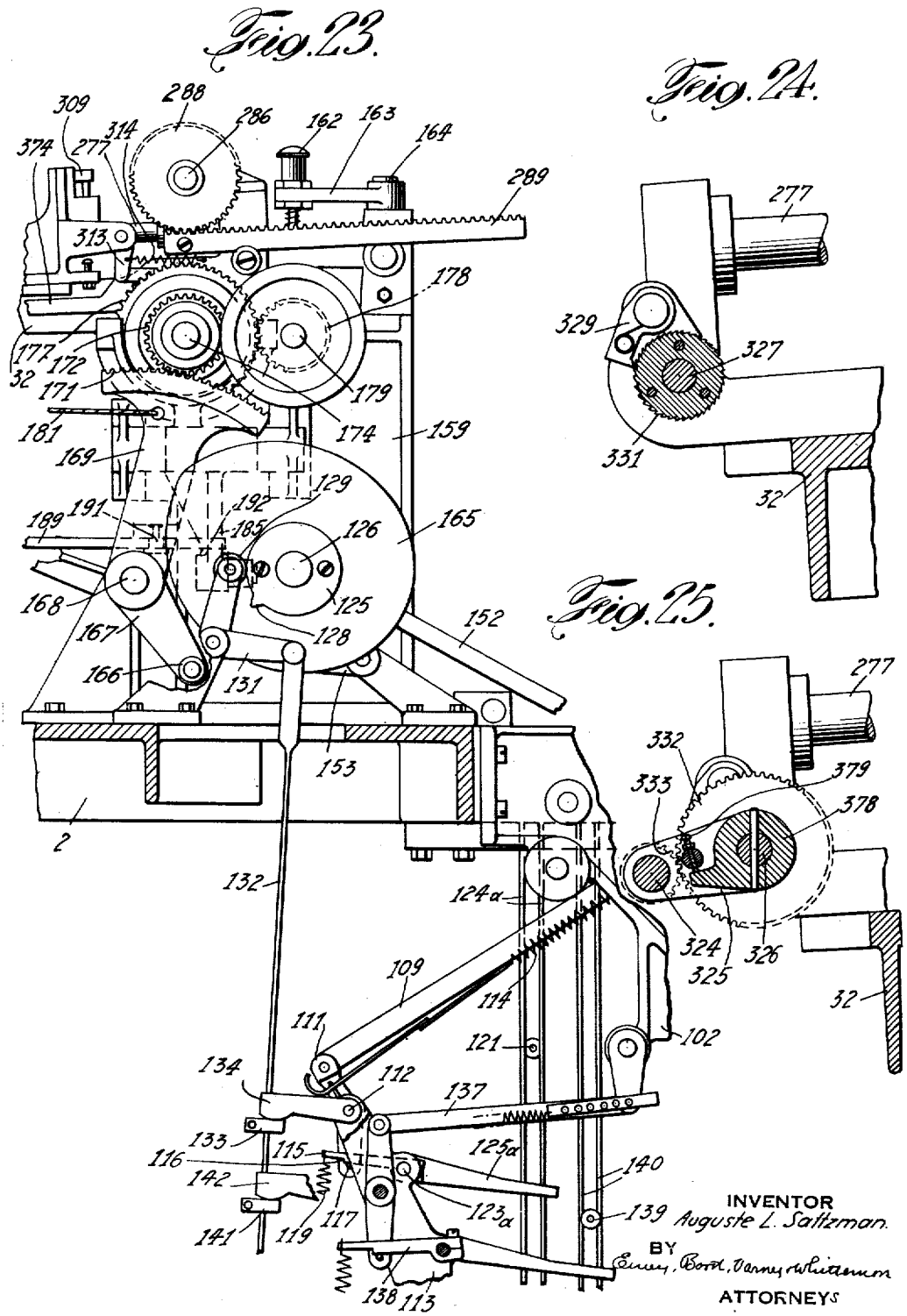

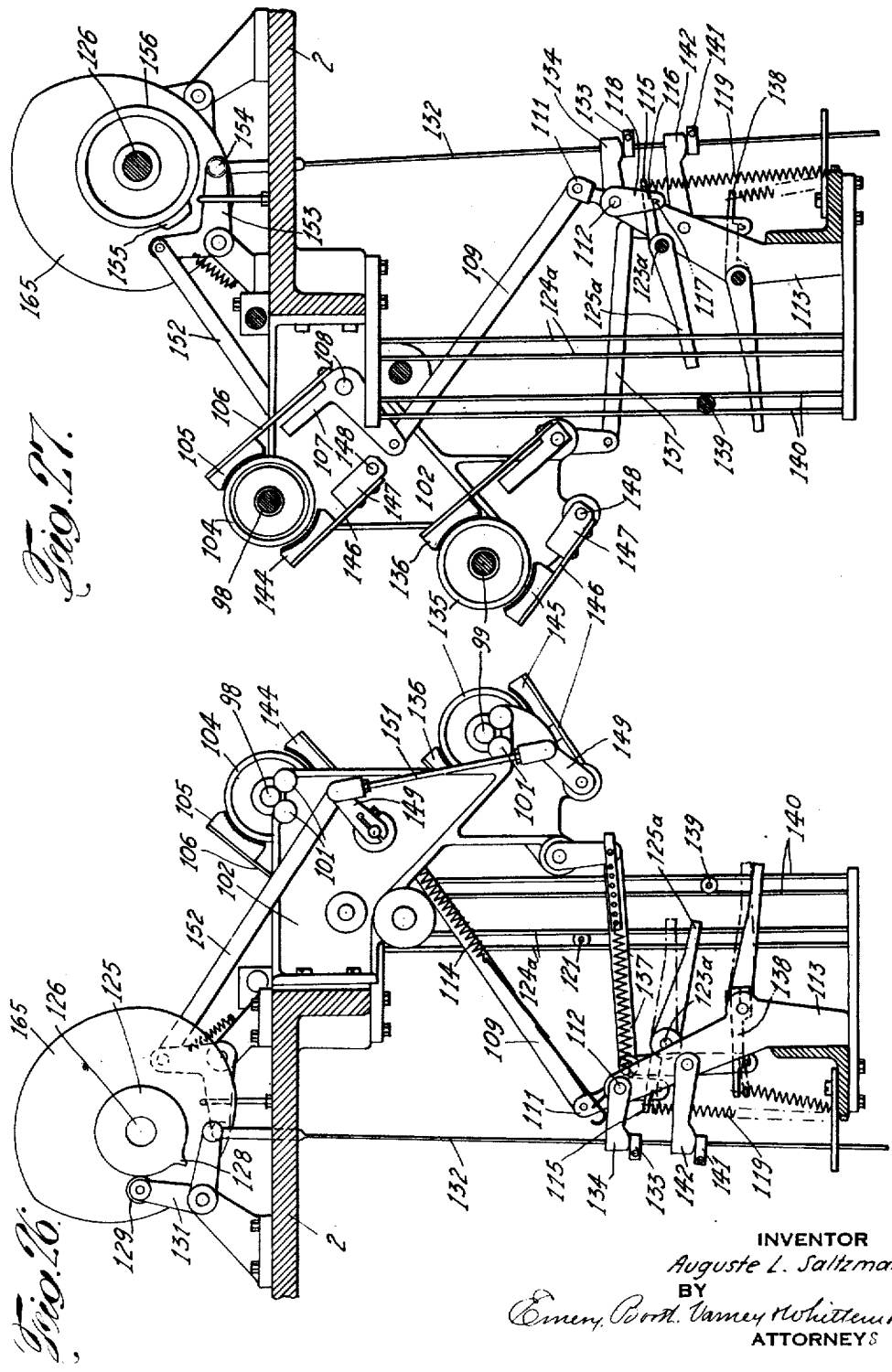

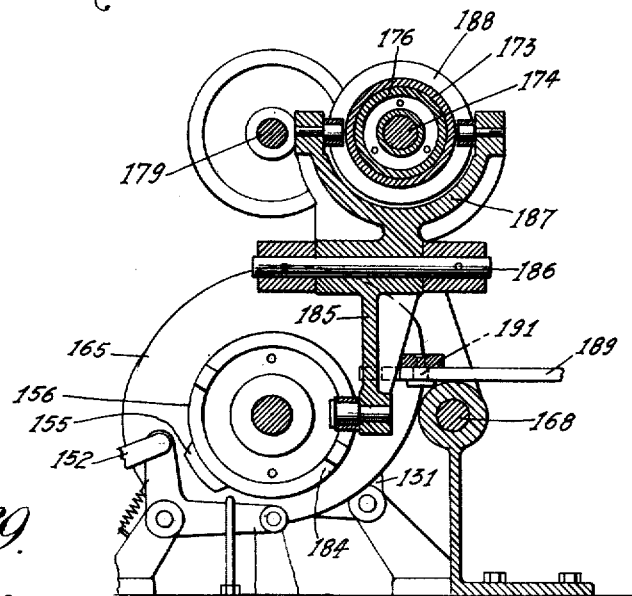
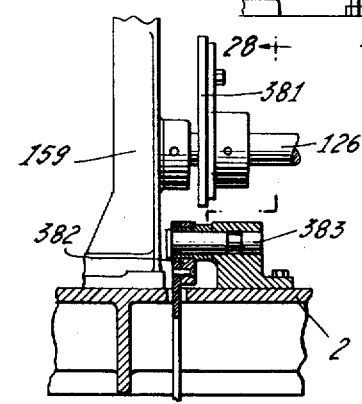
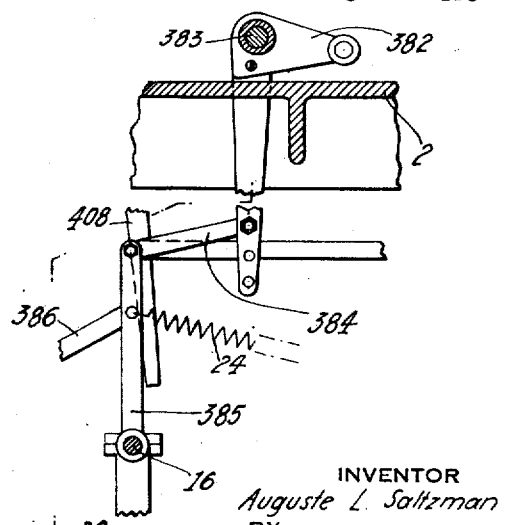
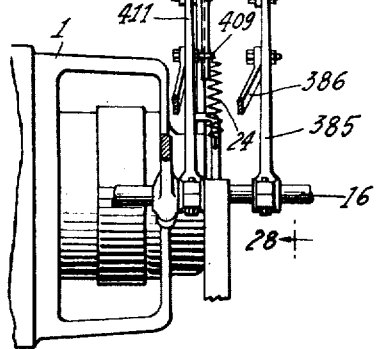

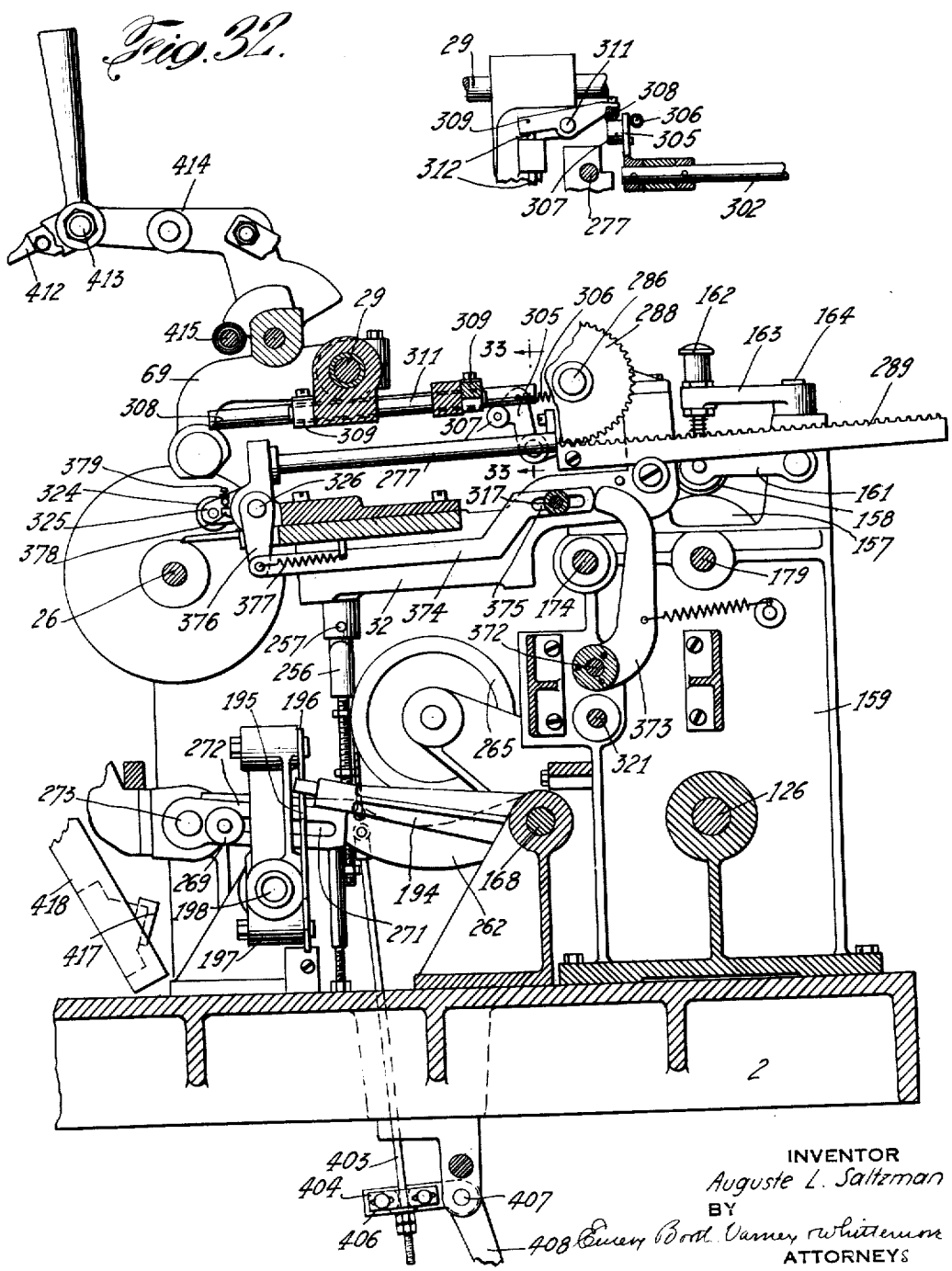

April 24, 1934.   A. L. SALTZMAN   1,955,764
WINDING MACHINE
Filed May 22, 1930   23 Sheets-Sheet 23

Inventor
Auguste L. Saltzman.
By his Attorneys
Emery, Booth, Varney & Whittemore Patented Apr. 24, 1934

1,955,764

UNITED STATES PATENT OFFICE 1,955,764

WINDING MACHINE

Auguste L. Saltzman, Orange, N. J., assignor, by mesne assignments, to General Cable Corporation, New York, N. Y., a corporation of New Jersey Application May 22, 1930, Serial No. 454,611

43 Claims. (Cl. 242—10)

The present invention relates to winding machines.

It is an object of the invention to provide an improved winding machine particularly adapted for automatically winding material such as wire into coils and for automatically delivering thereto measured sheets of windable material.

Other objects of the invention will be apparent from the following specification, wherein a preferred and illustrative form of the invention has been selected for description. In the accompanying drawings—

Figs. 3 and 4 are end elevational views looking, respectively, from the left and right of Fig. 1;

Fig. 11 is an enlarged, vertical sectional view taken on the line 11—11 of Fig. 1, illustrating one of the actuating means for the sheet accelerating mechanism, the other being shown in Fig. 7;

Fig. 12 is a similar view taken on the lines 12—12 of Figs. 1 and 5;

Fig. 13 is an enlarged, detail, vertical sectional view illustrating the preferred switch-control means for the electromagnet, and the preferred means for increasing the spacing between turns at the end of a traverse bar stroke, the sectional plane being taken on the lines 13—13 of Figs. 3 and 6;

Fig. 14 is an enlarged, detail vertical sectional view taken on the line 14—14 of Fig. 6;

Fig. 15 is a similar view taken on the line 15—15 of Fig. 17, illustrating the preferred cam-actuating means for the traverse-bar mechanism;

Fig. 16 is a vertical sectional view taken on the line 16—16 of Fig. 17;

Fig. 20 is a vertical sectional view illustrating one of the preferred spool-supporting frames and associated wire-tensioning means, the sectional plane being taken on the line 20—20 of Fig. 21;

Fig. 21 is a vertical sectional view taken on the line 21—21 of Fig. 20;

Fig. 22 is an enlarged, horizontal sectional view of the right hand half of the machine as viewed in Fig 5, the sectional plane being taken on the line 22—22 of Fig. 4;

Fig. 23 is a vertical sectional view illustrating a part of the preferred clutch-controlled actuating means for the web-feeding rolls, the sectional plane being taken on the line 23—23 of Fig. 22;

Figure 2:
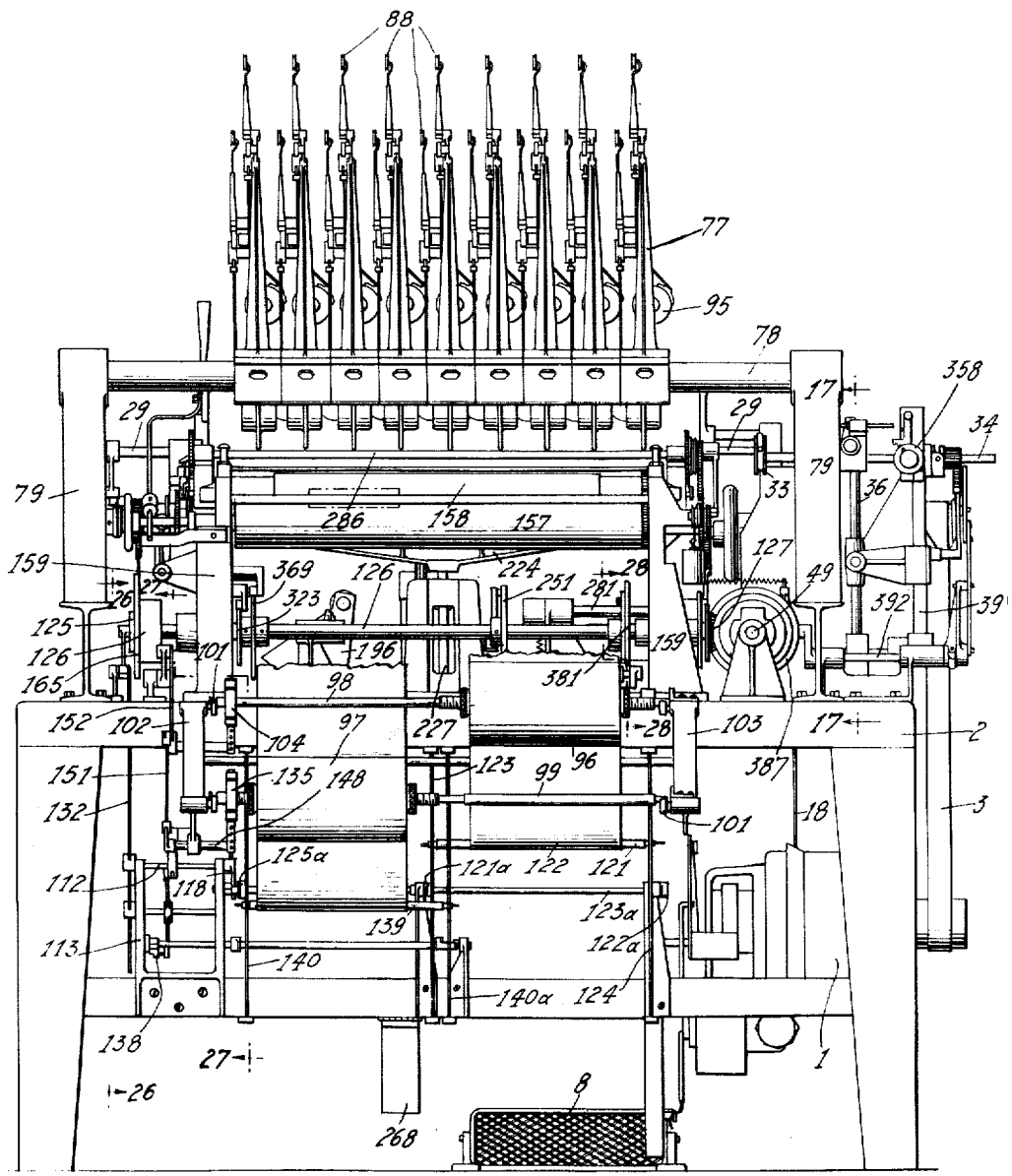
Figure 4:
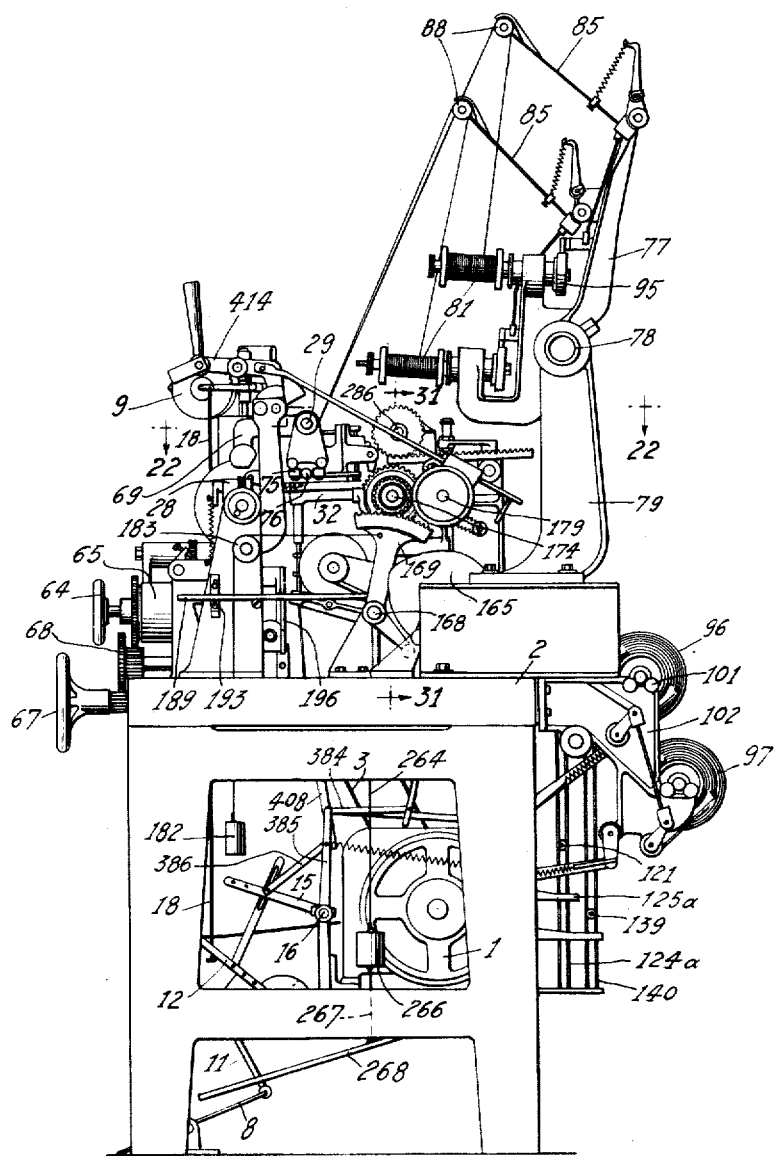
Figure 6:
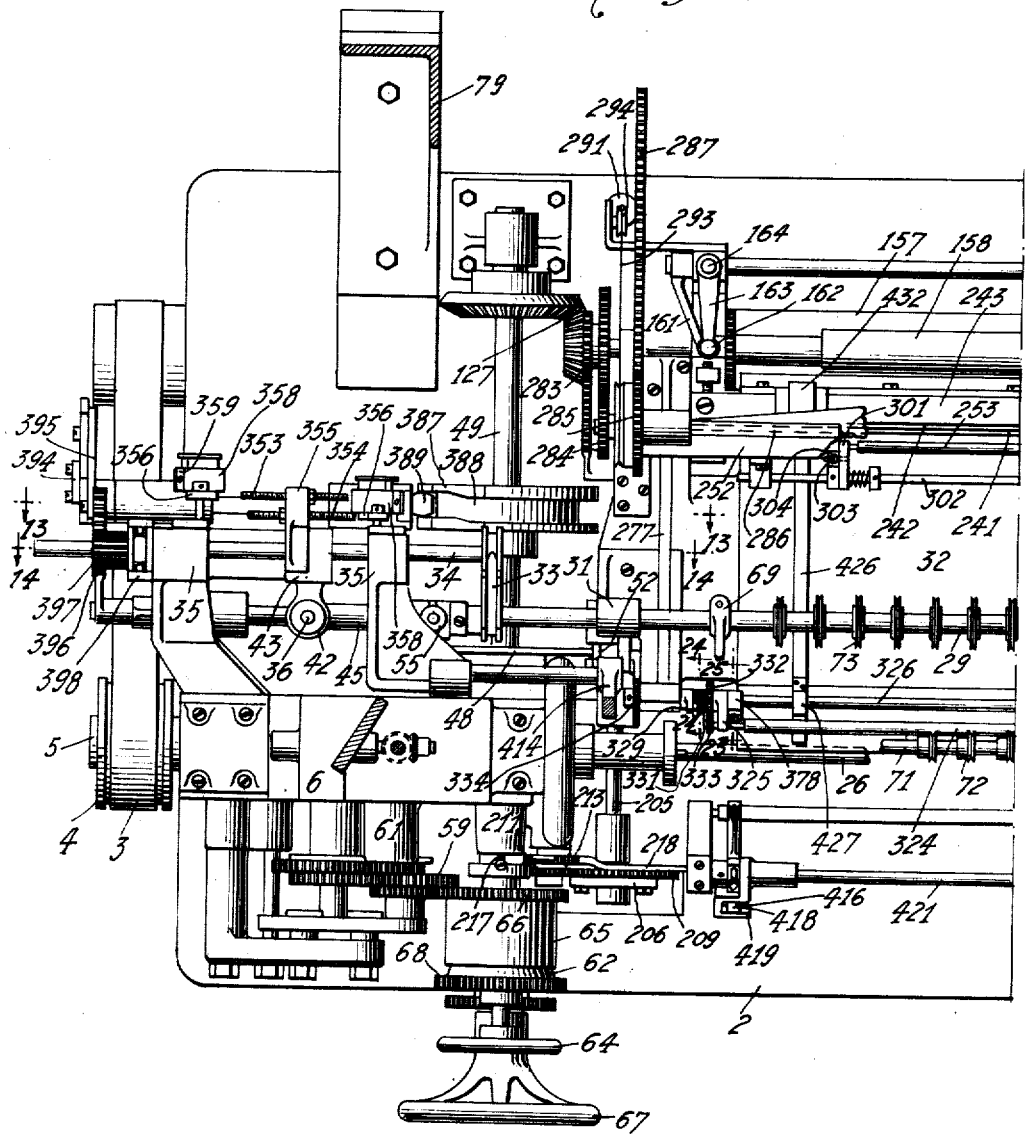
Fig. 6 is an enlarged, horizontal sectional view of the left hand half of the machine as viewed in Fig. 5, the sectional plane being taken on the line 6—6 of Fig. 3.
Figure 31:
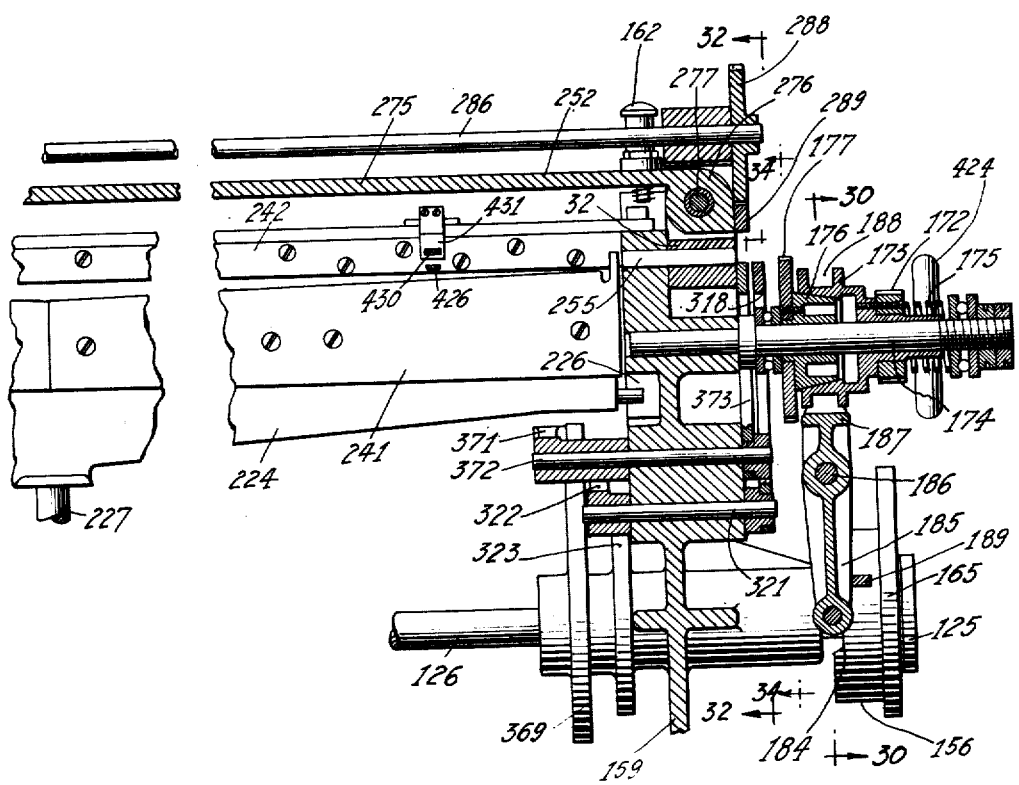
Figure 34:
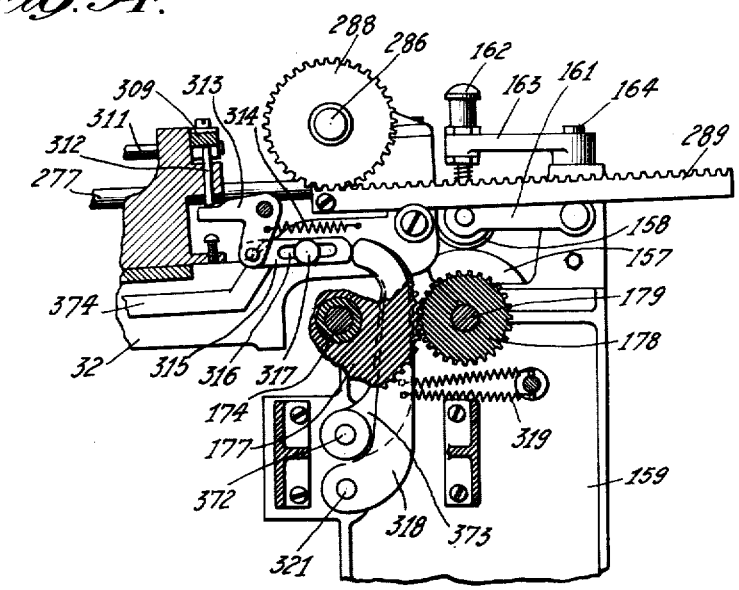

Figs. 24 and 25 are enlarged, detail, vertical sectional views taken, respectively, on the lines 24—24 and 25—25 of Fig. 6;

Figs. 26 and 27 are enlarged, detail, vertical sectional views of the brake-control means for the web-supplying rolls, the sectional plane being taken, respectively, on the lines 26—26 and 27—27 of Fig. 2;

Figs. 28 and 29 are detail, vertical sectional views illustrating the preferred means for automatically decreasing the speed of the winding spindle at about the end of the traverse stroke, the sectional planes being taken on the lines 28—28 and 29—29 of Figs. 2 and 28, respectively;

Fig. 30 is a detail, vertical sectional view taken on the line 30—30 of Fig. 31;

Fig. 31 is an enlarged vertical sectional view illustrating the preferred clutch mechanism for controlling the connection between the web-feeding rolls and their actuating means, the sectional plane being taken on the line 31—31 of Fig. 4;

Fig. 32 is a vertical sectional view taken on the line 32—32 of Fig. 31 and illustrates the preferred means for lifting the sheet-actuating members and the accelerator roll;

Fig. 33 is a sectional view taken on the line 33—33 of Fig. 32;

Fig. 34 is a view similar to Fig. 32 taken on the line 34—34 of Fig. 31; and

Figure 3:
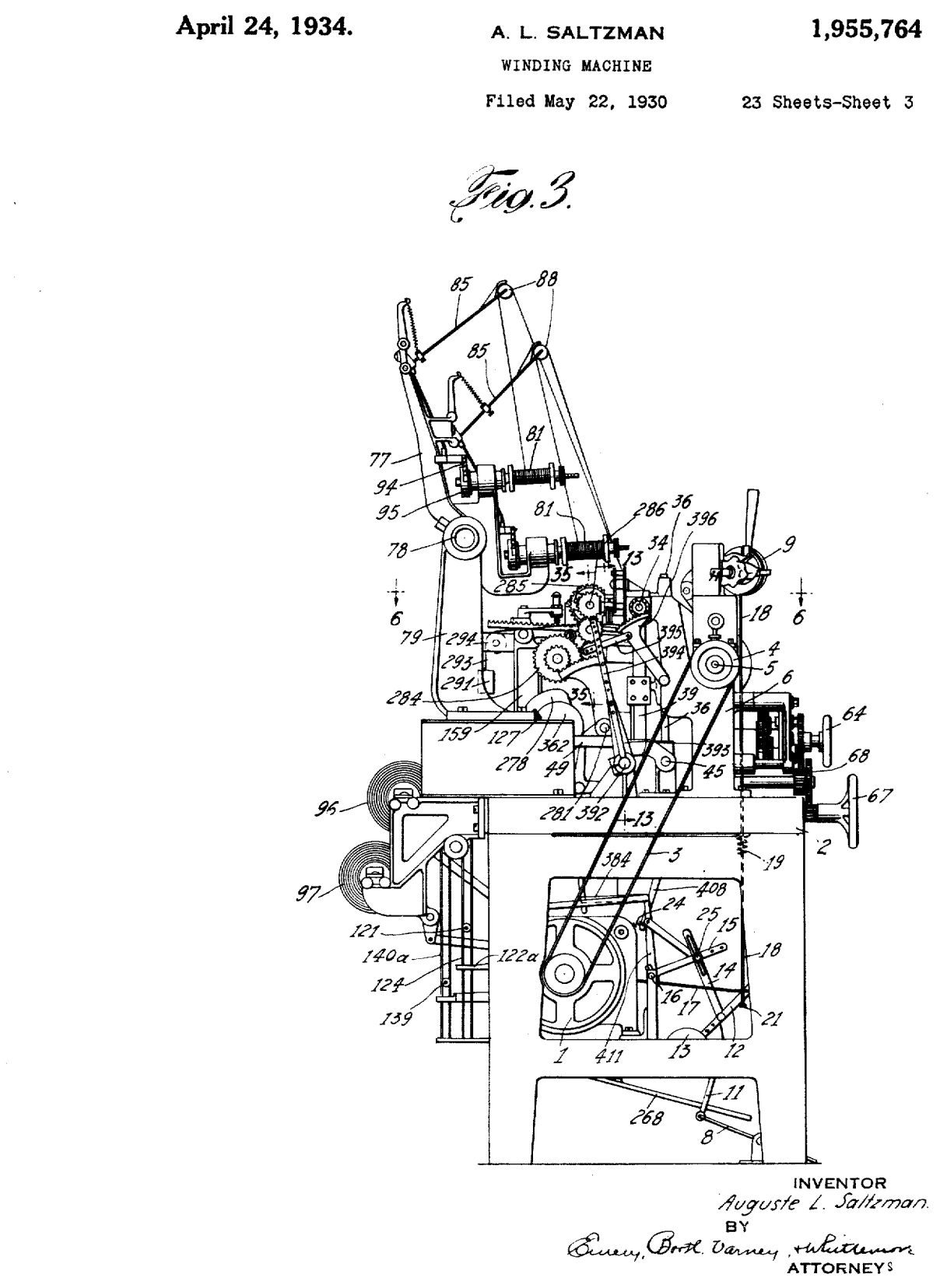
Figure 35:
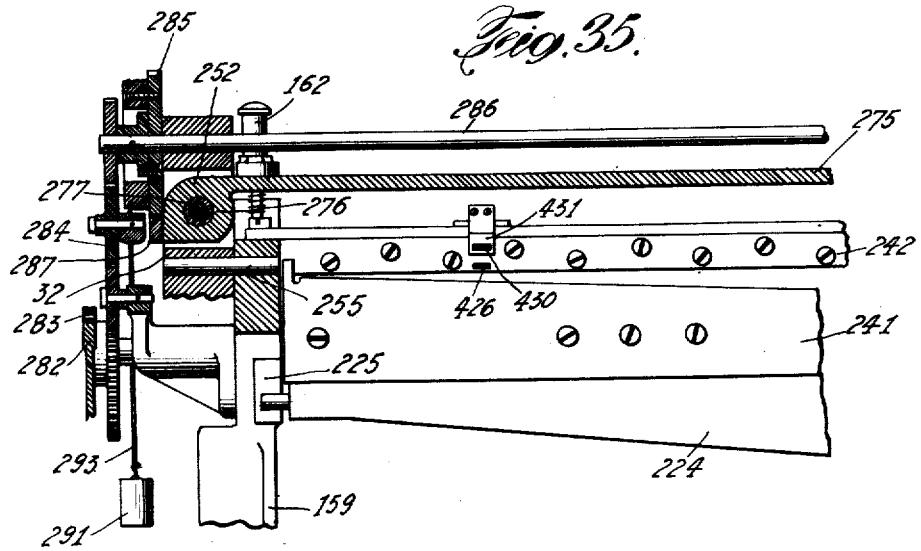

Fig. 35 is a view similar to Fig. 31 but showing the carriage-actuating gearing positioned at the left hand end of the machine, the sectional plane being taken on the line 35—35 of Fig. 3.

In the following description of the illustrative embodiment of the invention, the illustrative power-supply means with its control mechanism will first be described and then, in the sequence indicated, the illustrative mechanism for winding the wire in separated zones on the spindle to form simultaneously a plurality of spaced coil layers, and the illustrative mechanism whereby measured sheets of windable material may be automatically supplied to the coils under formation.

Figure 1:
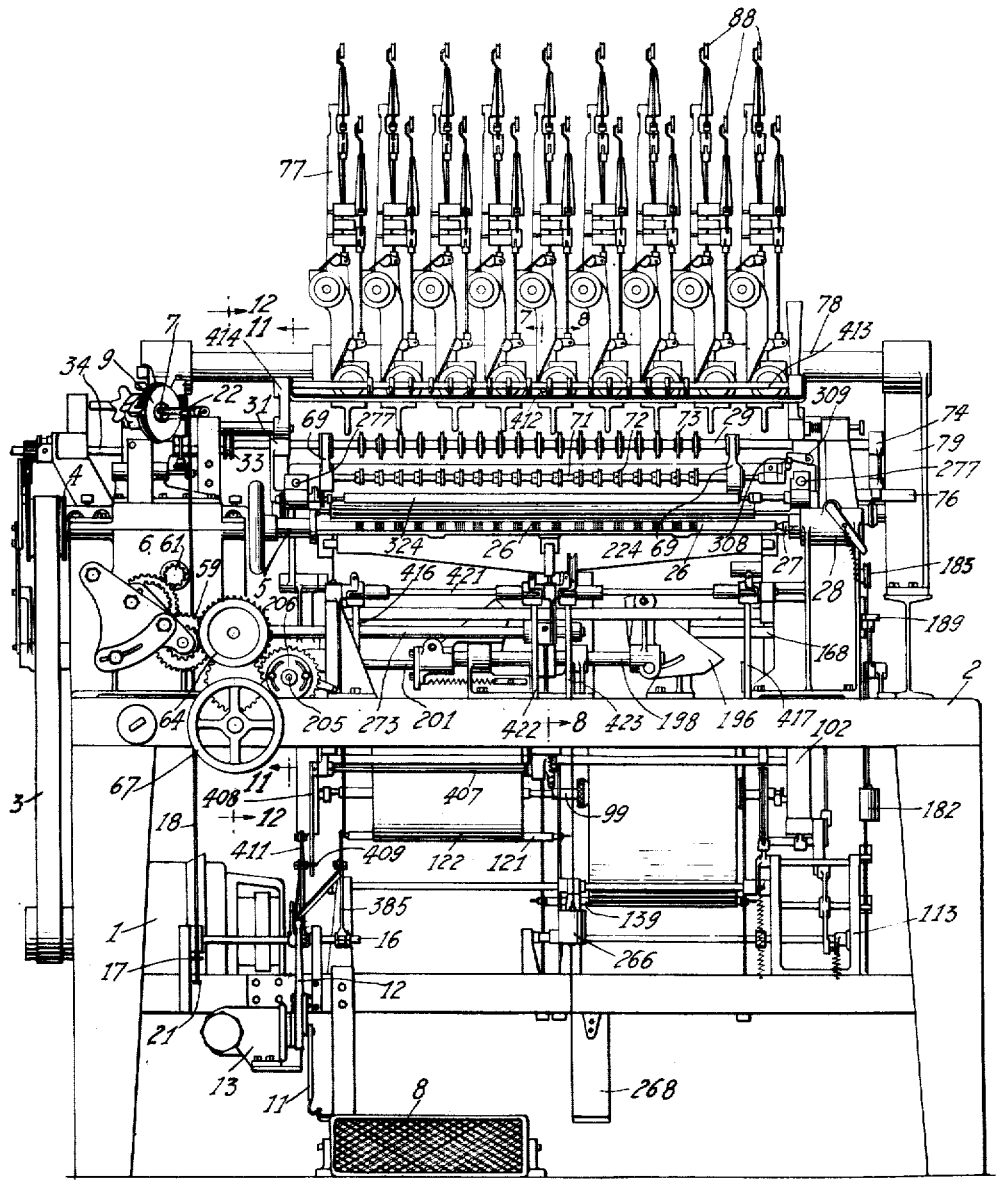
Figs. 1 and 2 are front and rear elevational views, respectively, of an automatic winding machine embodying the present invention.

Referring first to the illustrative power-supply means, a main source of power for the machine may conveniently take the form of an electric motor 1 which is suitably mounted below the left hand end portion of a main bed plate or table 2, as shown in Fig. 1. Conveniently, a belt 3 extends from the motor 1 to a pulley-wheel 4 mounted on the outer end of a horizontal shaft 5 rotatably supported in a winding head 6. The winding head is preferably mounted on the upper side of the bed plate 2 adjacent to the left front corner thereof.

Figure 7:
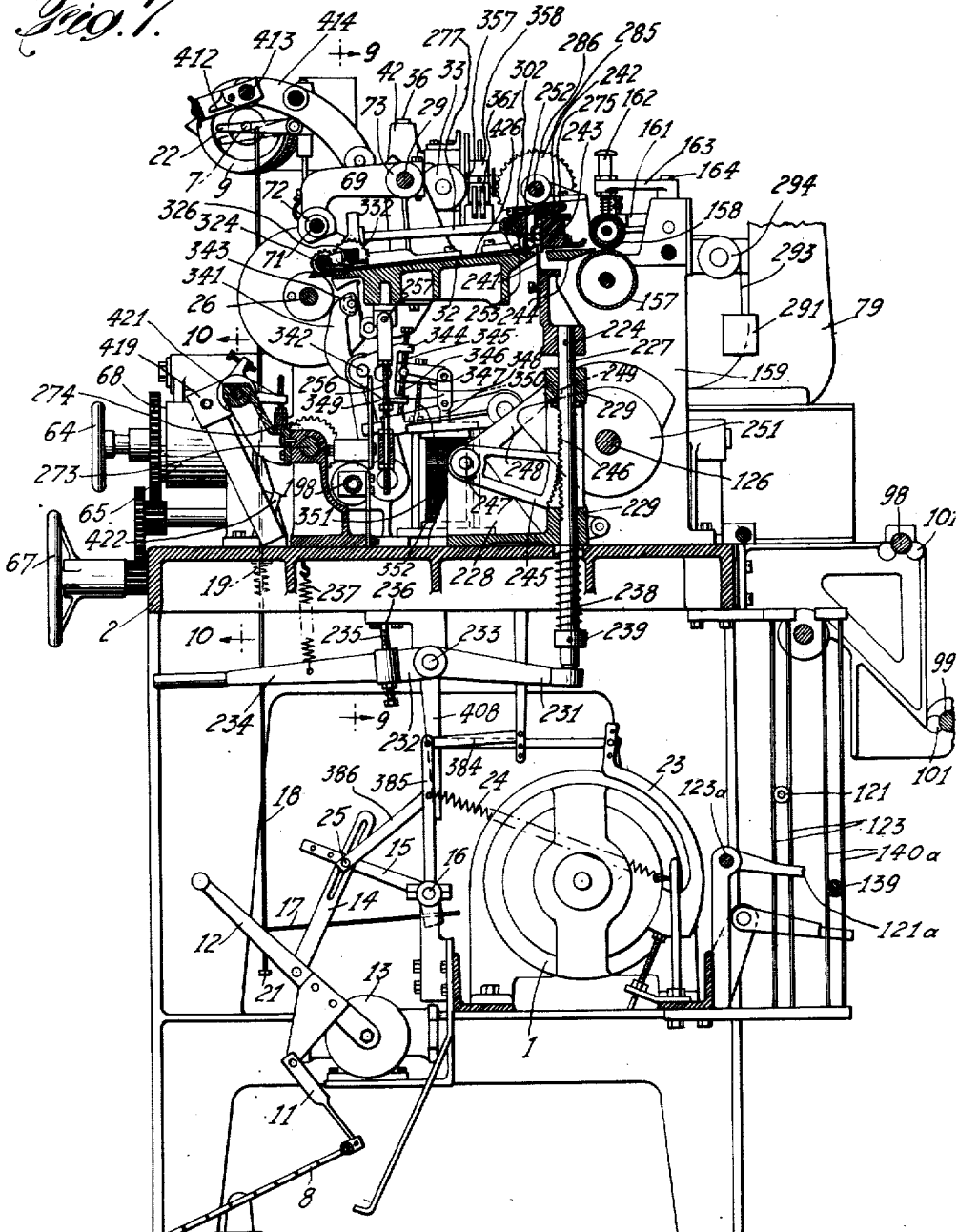
Fig. 7 is an enlarged, detail, vertical sectional view through the center of the machine looking in the direction of the left hand half thereof, the sectional plane being taken on the line 7—7 of Fig. 1.

The motor 1 may be conveniently provided with a control switch, a movable element of which is shown at 7 in Figs. 1 and 7. This element is conveniently spring-tensioned so as to tend to occupy normally its outer circuit-closing position. The position of the switch element 7 may be controlled by a foot-pedal 8 as well as by an adjustable counting device 9. The counting device 9 is adapted to actuate the switch element 7 inwardly into the circuit-opening position against the force of its spring when the machine has operated for a predetermined interval. The subsequent resetting of the counting device 9 permits the switch element 7 to move outwardly into its circuit-closing position unless restrained, as will presently appear.

The control of the switch element 7 by the foot-pedal 8 is conveniently effected through linkage illustrated in Figs. 3 and 7, wherein it will be observed that the foot-pedal is connected by a link 11 to a pivoted arm 12 constituting the movable member of a motion-retarding device 13 which may take the form of a door check referred to hereinafter. The arm 12 is connected by a link 14 to a crank arm 15 of a rock shaft 16 suitably supported adjacent to the motor 1. The shaft 16 is provided with an elongated crank arm 17 having an aperture through which extends a vertical rod 18. This rod is normally held by a spring 19 in the position shown in Figs. 3 and 7, wherein an adjustable abutment 21 is disposed just below and in a line with the crank arm 17. Conveniently, the vertical rod 18 extends up through an opening in the table 2 and is secured to a spring-pressed arm 22 which tends to move from the dot-and-dash line position shown in Fig. 7, wherein it merely engages the side of the switch element, into the solid-line position, wherein it engages the outer end of the switch element, preventing the outward movement of said switch element into its circuit-closing position.

It will be noted that the linkage just described is so designed that the foot-pedal 8 may be moved first through a predetermined angle without causing the actuation of the vertical rod 18. A further movement, however, causes the crank arm 17 to engage the abutment 21 and thereby move the spring-tensioned arm 22 out of holding engagement with the switch element 7 into the dot-and-dash line position shown in Fig. 7. The switch element now moves into its outer circuit-closing position, permitting the energization of the motor 1, but the machine remains at rest until the foot-pedal 8 has been released, as will appear hereinafter.

According to the present invention, the driving motor 1 is such that the speed thereof may be gradually increased from starting to normal running speed. To this end, the motor is conveniently provided with movable brush mechanism 23 for controlling the motor speed. Preferably, a spring 24 is provided for returning the brush mechanism from an advanced or neutral position, wherein the motor 1 remains at rest, although supplied with energizing currents, to the normal running position shown in Fig. 7, wherein the motor operates at maximum speed. The brush mechanism 23 is conveniently connected to the crank arm 15 and shaft 16 as shown in Figs. 1 and 3. Should the extent of movement of the arm 12 and the door check 13 be greater than that of the brush mechanism 23, a slotted connection 25 may be provided between the link 14 and the crank arm 15, so that the arm 12 may continue to move after the brush mechanism 23 has traversed its maximum movement.

The operation of the apparatus so far described is briefly as follows: the foot-pedal 8 is actuated to cause the turning of the crank arm 17 and the movement of the brush mechanism 23 from its normal running position to its starting or neutral position. When the brush mechanism 23 moves into its neutral position, the crank arm 17 engages the abutment 21, causing the actuation of the arm 22 from the solid-line position to the dot-and-dash line position shown in Figs. 1 and 7, thereby releasing the switch element 7. The switch element now moves into its outer circuit-closing position and currents are supplied to the motor 1, but, inasmuch as the brush mechanism 23 is in its neutral position, the machine remains at rest.

The release of pressure from the foot-pedal 8, however, results in the movement of the brush mechanism 23 from its starting position to its normal running position shown in Fig. 7 under the force of the spring 24. The movement of the brush mechanism between these two positions is so controlled by the door check 13, that the speed of the motor 1 is gradually accelerated. This is especially desirable where very fine wire is being used, inasmuch as it materially decreases the initial starting load on the wire and thereby tends to prevent the breakage thereof. The machine now continues to operate until the counting device 9 causes the actuation of the switch element 7 from its outer circuit-closing position to its inner circuit-opening position, whereupon the motor 1 is de-energized and the machine comes to rest. The inward movement of the switch element 7, however, permits the spring-tensioned arm 22 to return to its solid-line position where it engages the outer end of the switch element so as to prevent the outward movement thereof upon the resetting of the counting device 9.

Proceeding with the description of the machine, and more especially the illustrative mechanism for winding wire in separated zones so as to form simultaneously the plurality of spaced coil layers shown in Fig. 1, a winding spindle 26 is conveniently supported at its right hand end on a center 27 mounted for longitudinal movement in a tail stock 28. The left hand end of the spindle is detachably secured to the adjacent end of the shaft 5 in the winding head 6, whereby the rotation of said shaft may impart a corresponding movement to the winding spindle.

Figure 5:
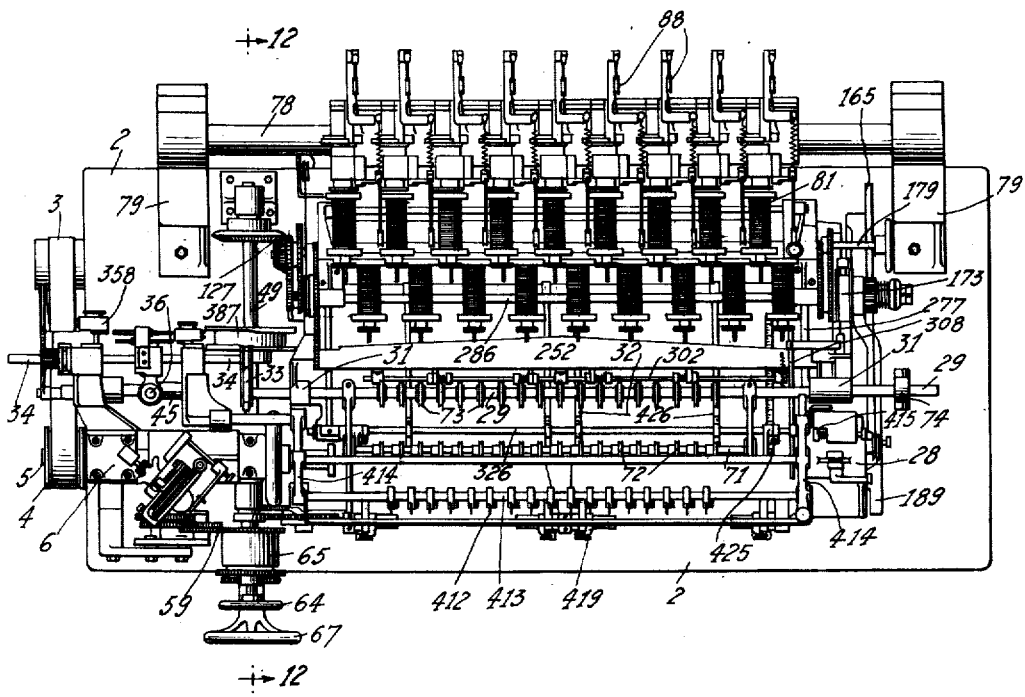
Fig. 5 is a top plan view of the machine.

Positioned in operative relation to the winding spindle 26 is a traverse-bar mechanism for guiding the wire back and forth so as to form the separate layers of wire, said mechanism comprising, in the present instance, a traverse bar 29. This bar extends horizontally across the front of the machine above the winding spindle 26 and is mounted for reciprocation in bearings 31, as shown in Figs. 5, 6 and 22. The bearings are conveniently mounted on the front edge portion of an angularly-adjustable frame 32 which constitutes one part of a preferred sheet-transfer means hereinafter described in detail. The left hand end of the traverse bar 29 is connected through a clutch 33 to a horizontal traverse rod 34 constituting another portion of the traverse-bar mechanism. The clutch 33 is adapted to maintain a connection between the bar 29 and the rod 34 for all angular positions of the frame 32. The traverse rod 34 may be suitably supported for reciprocatory movement in spaced bearings 35 positioned on the rear side of the winding head 6, as shown in Fig. 14.

Figure 17:
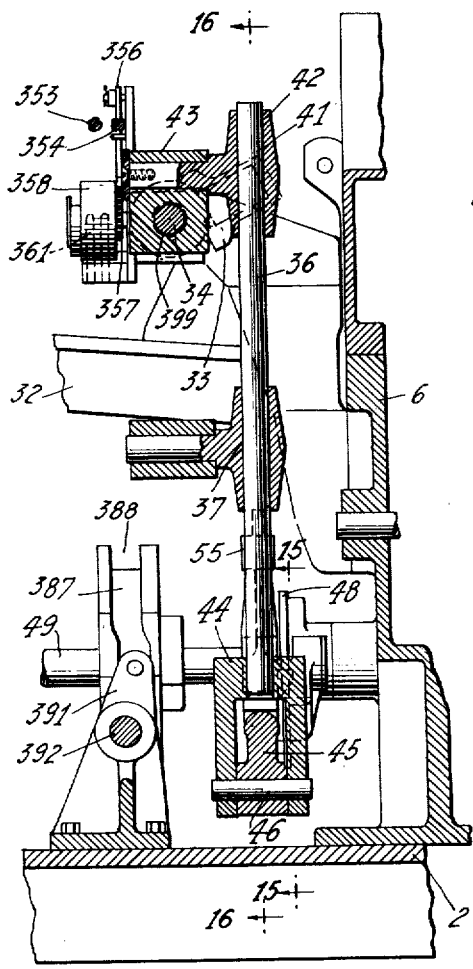
Fig. 17 is a vertical sectional view taken on the lines 17—17 of Figs. 2 and 13.

Suitable means are provided for reciprocating the traverse rod 34 and the traverse bar 29, the same being shown in Figs. 13 to 17, wherein it will be noted that an actuating lever 36 is fulcrumed intermediate its ends at 37 on a member 38 mounted for vertical adjustment on an upright support 39, whereby the stroke of the traverse rod 34 may be adjusted. The upper end of the lever 36 extends into an aperture 41 formed in a member 42 pivotally mounted in a block 43 carried by a portion of the traverse rod 34 intermediate the spaced bearings 35, whereby the operation of the lever 36 may cause the reciprocation of the traverse rod. The lower end of the lever 36 comprises a detachable portion 44 having a pair of arms extending on opposite sides of a horizontal reciprocatory member 45 and pivotally secured thereto by means of a pin 46, as shown in Figs. 16 and 17. The opposite ends of the traverse member 45 are suitably supported in spaced bearings 47 mounted on the adjacent portion of the bed plate 2.

Suitable means are provided for actuating the traverse member 45, the same being shown in the present instance as a cam 48 of heart shape mounted on a cross shaft 49 referred to hereinafter. In accordance with the present invention, the cam 48 co-acts with a pair of followers which preferably take the form of rods 51 and 52 of relatively small diameter journaled at their respective ends in pairs of anti-friction bearings 53 and 54. These bearings are respectively carried by a pair of supporting members 55 and 56. The member 55 is rigidly mounted on the upper side of the traverse member 45, as shown in Fig. 16. The member 56 is pivotally secured at 57 to a depending portion of the traverse member 45 and is actuated by a spring 58, so that the follower rod 52 continuously engages the traverse cam 48. One advantage of the particular follower construction shown herein is that it permits a large decrease in the diameter of the followers in engagement with the traverse cam and, consequently, a large decrease in the so-called "dead-angle" of the cam, that is, the angle through which the cam turns without moving the follower.

Referring to the cross shaft 49, upon which the traverse cam 48 is mounted, as shown in Figs. 1, 5, 6 and 12, the front end of this shaft is suitably journaled in the winding head 6. Conveniently, the cross shaft 49 is connected through a change gear-train 59 to a driving pinion 61, which is actuated by the shaft 5 through gear-wheel mechanism (not shown). This gear-train may be rendered ineffective to drive the cross shaft 49 by means of a clutch 62, one element 63 of which is splined to the cross shaft 49 and adapted to be moved axially thereof upon the turning of a hand-wheel 64. A co-acting element 65 of the clutch 62 is secured to a gear-wheel 66 constituting part of the change gear-train 59. The arrangement is such that, when the hand-wheel 64 is turned in one direction, the clutch element 63 is actuated out of engagement with its co-acting element 65 to render the gear-train 59 ineffective, an opposite movement of the hand-wheel 64 causing the actuation of the clutch element 63 into its original position shown in Fig. 12, wherein the gear-train 59 is effective to drive the cross shaft 49. A hand-wheel 67 is connected by gear-wheel mechanism 68 to the clutch element 63, whereby the cross shaft 49 with its connected mechanism may be actuated when the clutch elements are disengaged by the hand-wheel 64.

Referring to the traverse bar 29, as shown in Figs. 1, 5, 6 and 22, this bar is provided at its ends with a pair of forwardly projecting arms 69 which rotatably support a rod 71. This rod is provided with a plurality of wire-guiding rollers 72 which are secured thereto for axial adjustment. The traverse bar 29 is provided with wire-guiding rollers 73 which are loosely mounted thereon. Due to the turning effect of the rod 71 with its guiding rollers 72 on the traverse bar 29, an additional bearing is provided therefor which may take the form shown in Figs. 4 and 22, wherein it will be noted that a member 74 is mounted on the extreme right end of said traverse bar 29. This member is provided with a depending portion having a pair of spaced anti-friction elements 75 adapted to receive therebetween a guiding rod 76. The rod 76 is sufficiently long, so that the rollers 75 engage the same throughout the full stroke of the traverse bar 29.

Suitable means are provided for supplying wire to the winding spindle 26 so as to permit a plurality of coils to be simultaneously wound thereon in separated zones. A preferred illustrative means is shown in Figs. 1 to 5, inclusive, and Figs. 20 and 21, wherein it will be observed that a plurality of spool-supporting frames 77 are mounted on a horizontal bar 78 for independent angular and axial adjustment. This bar is conveniently supported at the rear edge of the table 2 on a pair of spaced standards 79. As shown particularly in Figs. 20 and 21, each of the angularly-adjustable frames 77 is provided with a pair of spools or bobbins 81. Each of these spools is releasably clamped on a mandrel 82 journaled in an angularly-adjustable bearing 83 supported by a raised shoulder portion 84 of the frame 77.

It is desirable that means be provided in connection with the spools 81, whereby the initial heavy pull on the wire incident to the starting of the machine may be decreased to a greater extent than is possible through the use of the door check 13 and its connected speed-control means. Also, it is desirable that means be provided for preventing the spools 81 from overrunning during the stopping of the machine. To this end, there is associated with each of the spools 81 a tension rod 85 which is secured at its inner end to a pivotally mounted block 86 and which is resiliently held in its upper solid-line position shown in Fig. 20 by adjustable spring-tensioned means 87. An outer end of the tension rod 85 is provided with a guide roller 88 about which the wire from the spool 81 is passed. The threading of the wire on the guide roller 88 is facilitated by means of a finger 89 which is positioned just about the roller, as shown in Fig. 20, and is secured to the tension rod 85. The block 86 is connected by a link 91 to one arm of a lever 92, an opposite arm of which carries a spring strip 93 provided with a brake shoe 94 disposed in operative relation to a brake drum 95 mounted on the inner end of the mandrel 82.

The parts just described are so arranged that when the load on the wire increases, as occurs during the starting of the machine, this condition is at least partly compensated for by the downward movement of the tension rod 85 from the solid-line position to some lower position, as, for example, the dot-and-dash line position shown in Fig. 20. The downward movement of the tension rod 85 through the link 91 and lever 92 causes the actuation of the brake shoe 94 away from the drum 95, so that the spool 81 is free to rotate. When the load on the wire passing from the spool is removed, as occurs when the machine is coming to rest, the tension rod 85 moves from its dot-and-dash line position to its solid-line position under the force of the spring-tension means 87. This movement causes the brake shoe 94 to engage the brake drum 95, with the result that the spool 81 comes to rest rapidly without undesirable overtravel.

Should a more gradual application of the brake be desirable than is afforded by causing the entire surface of the shoe to engage simultaneously the brake drum 95, this may be effected by positioning the shoe as shown in Fig. 21, wherein it will be noted that said shoe is slightly angled, with the heel thereof spaced from the drum a greater distance than the toe. As a result, when the shoe 94 is actuated toward the drum 95, there is a gradual increase in the area of contact and, consequently, in the braking effect. Under certain conditions, as when an unusually tight winding is required and heavy wire is being used, the brake may be so adjusted that the toe of the shoe 94 continues to engage the brake drum 95 when the tension rod 85 is in the dot-and-dash line position shown in Fig. 20, the extent of said engagement being determined by the size of the wire and the desired tightness of the winding.

Proceeding with the description of the machine, the illustrative mechanism, whereby measured sheets of windable material of progressively increasing length may be supplied to the coils under formation on the winding spindle 26, is shown in Figs. 1, 2, 4 to 9, inclusive, 22 to 27, inclusive, and 30 to 34, inclusive. This automatic mechanism comprises, in general, a pair of separate web-supply means, which are suitably positioned in side-by-side relation at the rear of the machine and extended below the table 2; a common web-feeding means for the pair of webs extending from the supply means, which are conveniently positioned at the rear of the machine but above the table 2; a common web-severing means for the pair of webs, which are positioned on the upper side of the table 2 just in front of the web-feeding means; and common transfer means positioned at the front of the machine, whereby the sheets cut by the web-severing means may be delivered to the winding spindle 26.

Considering first the pair of separate web-supply means, this means may conveniently take the form shown in Figs. 2, 23, 26 and 27, wherein it will be observed that a pair of web rolls 96 and 97, which may be formed of paper, are respectively mounted on upper and lower shafts 98 and 99, the ends of which are suitably journaled in anti-friction bearings 101 mounted in a pair of spaced brackets 102 and 103 suitably secured to the rear edge of the table 2 and extending below the same. These rolls are axially offset so as to permit the feeding of two narrow webs instead of a single wide web to the severing means. Under some conditions, it may be desirable to substitute for the two web rolls a single roll of increased width.

In the operation of the machine, it has been found that the delivery of the webs of paper to the web-feeding means is very greatly improved if the material necessary for the feeding operation is previously withdrawn from the rolls. To this end, the supporting shaft 98 for the upper roll 96 is provided with a brake drum 104 which is adapted to co-act with a main brake shoe 105 mounted on an upper end of a spring strip 106 adjustably supported on one arm of a bell-crank lever 107 pivotally mounted at 108. The other arm of this bell-crank lever is connected by means of a link 109 to a crank arm 111 of a crank shaft 112 suitably journaled in a supporting member 113. A spring 114 serves to hold the brake shoe 105 normally in an effective position, wherein it engages the brake drum 104.

Suitable means are provided for periodically holding the brake shoe 105 in an ineffective position against the force of the spring 114 for reasons as will presently appear, said means being herein shown as a latch 115. This latch is provided with a recess 116 adapted to receive an adjacent holding pin 117 when the brake shoe 105 is to be held in its ineffective position. The pin 117 is mounted on a crank arm 118 secured to the crank shaft 112. A spring 119 serves to hold the latch 115 in co-operative relation to the pin 117.

The tripping of the latch 115 is automatically controlled by a draw bar 121, which is positioned in a loop portion 122 of the web extending from the roll 96 to the web-feeding means, and which co-acts at its opposite ends with a pair of crank arms 121a and 122a mounted on a crank shaft 123a carrying the latch 115. The crank arms 121a and 122a are so positioned as to be actuated to cause the tripping of the latch 115 when the loop portion 122 is of desired dimensions, that is to say, when the required supply of web material has been withdrawn from the web roll 96. The draw bar 121 may be guided during this movement by pairs of vertical guide bars 123 and 124 through which the opposite ends of the draw bar 121 extend. Should the web rolls 96 and 97 be replaced by a single relatively long roll (not shown), then the center pair of guide bars 123 and the crank arm 121a are removed, and a relatively long draw bar (not shown) is inserted in the loop portion of the web. One end of this draw bar is guided by the outer pair of guide bars 124, while the other end is guided by a pair of bars 124a. A crank arm 125a extending from the crank shaft 123a co-acts with this end of the long draw bar, the other end thereof co-acting with the crank arms 122a.

Suitable means are provided for automatically actuating the brake shoe 105 into its ineffective latched position after the operation of the web-feeding means, the same being herein shown as comprising a cam 125 mounted on a main cam shaft 126 extending across the rear of the machine just above the bed plate 2 and connected by angularly-adjustable bevel gear-wheels 127 to the cross shaft 49. The cam 125 is provided with an actuating shoulder 128 which co-acts with a roller 129 mounted on one arm of a spring-tensioned bell-crank lever 131, an opposite arm of which is connected to an upper end of a vertical rod 132. This rod extends downwardly through an opening in the bed plate 2 and is provided with a vertically adjustable abutment 133 positioned to co-act with a crank arm 134 mounted on the crank shaft 112. The supporting shaft 99 for the web roll 97 is provided with a brake drum 135 and a co-operating spring-pressed shoe 136 which is actuated by linkage 137 and releasably held in an ineffective position by a spring-actuated latch 138 controlled by a draw bar 139 guided by pairs of guide bars 140 and 140a, in exactly the same manner as the mechanism associated with the brake for the web roll 96. The actuating linkage 137 for the brake shoe 136 is operated simultaneously with that associated with the brake shoe 105 through an adjustable abutment 141 on the vertical rod 132 and a crank arm 142. In this manner, both brake shoes are periodically actuated together into their ineffective position by the cam 125 throughout the operation of the machine.

In the operation of the brake mechanism just described, the clock-wise rotation of the main cam shaft 126, as viewed in Fig. 26, causes the actuating shoulder 128 to rock the bell crank lever 131, thereby lifting the rod 132 and causing the turning of the crank arms 134 and 142. This movement of the crank arm 134 through the link 109 and the bell-crank lever 107 causes the actuation of the brake shoe 105 out of engagement with the brake drum 104 against the force of the spring 114. At the same time, the crank arm 118 carrying the pin 117 is moved so as to permit the latch 115 to move under the force of the spring 119 into holding engagement with said pin. The continued turning of the cam 125 causes the disengagement of the actuating shoulder 128 from the bell-crank lever 131, but the brake shoe 105 remains in its ineffective position due to the latch 115.

With the release of the brake shoe 105 from its drum 104, the web roll 96 turns under the weight of the draw bar 121, permitting the latter to drop and thereby draw a supply of paper from the roll. When the desired amount has been withdrawn, the ends of the draw bar 121 engage the pair of crank arms 121a and 122a, causing the actuation of the latch 115 from its holding or effective dot-and-dash line position shown in Fig. 26 to its ineffective solid-line position, wherein the pin 117 is disengaged from the latch recess 116. When this disengagement occurs, the spring 114 causes the return movement of the brake shoe 105 into engagement with the brake drum 104 and the consequent stoppage of rotation of the web roll 96. It is noted that the braking action on the web roll 97 is exactly the same as that just described for the roll 96 and occurs simultaneously therewith.

Should the machine come to rest with the actuating shoulder 128 of the cam 125 in engagement with the roller 129 of the bell-crank lever 131, the brake shoes 105 and 136 are positively held in their ineffective position, so that the dropping of the draw bars 121 and 139 has no effect thereon. As a result, there is a very undesirable over travel of the web rolls 96 and 97. This condition is conveniently met by means of auxiliary brake shoes 144 and 145 which are respectively positioned in co-operative relation to the brake drums 104 and 135, as shown particularly in Figs. 26 and 27. Each of these brake shoes is mounted on a spring strip 146 secured to a crank arm 147 mounted on a crank shaft 148. Each of the crank shafts is provided with a crank arm 149 which are inter-connected by means of a link 151. The link 151 and the upper crank arm 149 are connected by a link 152 to one arm of a spring-tensioned bell-crank lever 153, an opposite arm of which is provided with a roller 154 positioned in operative relation to an actuating shoulder 155 of a cam 156.

When the main cam shaft 126 is turned in a counter clock-wise direction, as viewed in Fig. 27, the cam shoulder 155 periodically causes the rocking of the bell-crank lever 153 and, consequently, the periodic engagement of the brake shoes 144 and 145 with the drums 104 and 135, respectively. This braking engagement is timed to occur during the relatively short period that the actuating shoulder 128 of the cam 125 is in engagement with the roller 129 of the bell-crank lever 131. It will thus be seen that if the machine should stop with the actuating shoulder 128 in a position to hold the brake shoes 105 and 136 in their ineffective position, the unwinding of the web rolls 96 and 97 by the respective draw bars 121 and 139 is prevented by the engagement of the auxiliary brake shoes 144 and 145 with the brake drums 104 and 135, respectively, and this braking action continues so long as the actuating shoulder 155 of the cam 156 is in engagement with the roller 154 of the bell-crank lever 153. During the normal operation of the machine, such breaking action is momentary only, in view of the short length of the actuating shoulder 155.

Considering next the illustrative web-feeding means, which is shown in Figs. 2, 6, 7, 8 and 22, said means conveniently comprises a lower supporting roll 157 and an upper pressure roll 158. The lower supporting roll 157 is suitably mounted at its opposite ends on a pair of vertical side plates 159 carried by the table 2 adjacent to the rear edge thereof. The upper pressure roll 158 is conveniently mounted at its opposite ends on a pair of arms 161 pivotally supported on the adjacent side plates 159. The upper roll is preferably pressed toward the lower roll 157 by spring means, so that proper contact may be obtained with the webs of paper passing between the two rolls. One such spring means may conveniently comprise a pair of spring-pressed plungers 162 which are so positioned as to engage the arms 161, respectively, as shown in Figs. 6 and 22. Each of the plungers 162 is conveniently mounted in an arm 163 pivoted at 164.

Considering next the means for actuating the pair of web-feeding rolls, as shown in Figs. 4, 22, 23, 30 and 31, the main cam shaft 126, which is so actuated by the cross shaft 49 as to make two revolutions for a complete reciprocation of the traverse bar 29, is provided with a cam 165 on the right hand end thereof. This cam co-acts with a roller 166 which is mounted on one arm of a bell-crank lever 167 rigidly secured to a rock shaft 168 suitably supported. The other arm 169 is provided with gear teeth 171 adapted to mesh with a gear-wheel 172 secured to a clutch element 173 loosely mounted on a shaft 174 carried by the adjacent vertical side plate 159. The clutch element 173 is normally urged by a spring 175 into engagement with a co-acting clutch element 176 loosely supported on the shaft 174 and provided with a gear-wheel 177 which meshes with a gear-wheel 178 mounted on an outer end portion 179 of the supporting shaft for the lower feed roll 157. The gear-sector arm 169 of the bell-crank lever 167 is connected by a flexible element 181 to a source of power which is independent of the main source of power 1 for the machine. Conveniently, this separate power source may take the form of a weight 182. As shown in Fig. 4, the flexible element 181 extends vertically from the weight 182 around a pulley-wheel 183 and then horizontally to the arm 169. The force of this weight on the arm 169 is sufficiently heavy to cause the operation of the pair of web feed rolls 157 and 158.

Conveniently, the clutch, which is positioned between the bell-crank lever 167 and the pair of web feed rolls, is automatically operated by means of a cam 184 which is mounted on the main cam shaft 126 immediately adjacent to the cam 165, as shown in Fig. 31. The cam 184 co-acts with the lower arm 185 of a lever which is pivoted at 186. An upper arm 187 of the lever is bifurcated as shown in Fig. 30 and it is provided with spaced studs which extend into a groove 188 in the clutch element 173, whereby the rocking of the lever by the cam 184 may cause the movement of said clutch element against the force of the spring 175 so as to render the clutch ineffective.

Under certain conditions, such as the manual operation of the feed rolls, it is desirable to operate the clutch by hand independently of the cam 184 and to hold the clutch in its ineffective position. This desirable result is accomplished in the manner shown in Figs. 4 and 23, wherein it will be noted that a hand lever 189 is pivoted at 191 for horizontal movement, with an inner end portion 192 positioned in engagement with the lower arm 185 of the clutch actuating lever. The outer end of the lever 189 normally extends into a recess formed in a vertically adjustable block 193 suitably mounted on an adjacent portion of the machine. The arrangement is such that when the lever 189 is moved out of this recess, the block 193 drops under its own weight, thereby preventing the return movement of the lever 189 into the recess. The clutch is now held in its ineffective position against the force of the spring 175 during which time the lower arm 185 of the clutch actuating lever is positioned out of the path of travel of the cam 184. In order to release the clutch element 173 from its ineffective position and again permit the automatic operation thereof by the cam 184, it is necessary only to raise vertically the block 193, so as to permit the hand lever 189 to move into the recess therein under the force of the spring 175.

The operation of the apparatus just described is as follows: assuming the hand lever 189 to be in its ineffective position shown in the drawings, the gear-sector arm 169 of the bell-crank lever 167 is successively moved in opposite directions by the cam 165 and the weight 182, the maximum period during which the latter is effective being determined by the falling portion of the cam 165. When the gear-sector arm 169 is moved to the left, as viewed in Fig. 23, under the force of the weight 182, the feed rolls 157 and 158 are operated to feed forwardly the pair of webs from the supplies previously withdrawn from the rolls 96 and 97 by the draw bars 121 and 139, respectively. The cam 184 is so positioned that during the opposite movement of the gear-sector arm 169, which is due to said cam 165, the clutch element 173 is disengaged from its co-acting clutch element 176, so that the feed rolls 157 and 158 remain at rest. This return movement of the gear-sector arm 169 causes the raising of the weight 182 and the positioning of the parts, so that another supply of paper may be fed forwardly by the feed rolls under the force of the weight 182 when the cam 165 has again made the required angular movement. Thus, the feed rolls 157 and 158 are automatically operated by a source of power separate from the driving motor 1 and the parts are automatically reset preparatory to each feeding operation by the cam 165 which is driven by the motor 1.

Throughout the operation of the machine, as the diameter of the coils under formation on the spindle 26 increases, it is desirable to increase progressively the length of the sheets of windable material, so that said sheets may be of sufficient length to extend at least once around the coils with the desired amount of overlap. Suitable means are provided for accomplishing this result, the same being shown in Figs. 1, 9 and 32, wherein it will be noted that the supporting rock shaft 168 for the bell-crank lever 167 is extended inwardly beyond the adjacent vertical side plate 159 and terminated in a forwardly extending crank arm 194. Hence, the outer end of this arm is raised and lowered in accordance with the operation of the bell-crank lever 167 by the cam 165 and the weight 182, respectively.

Figure 9:
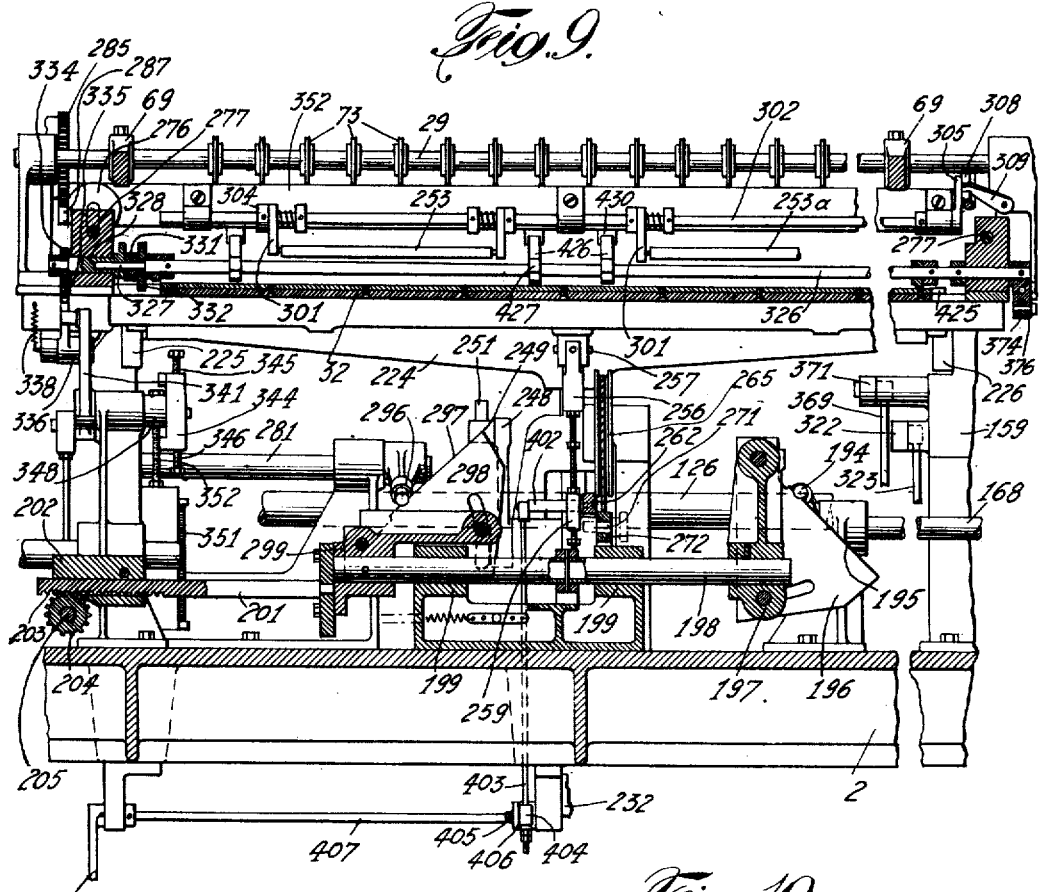
Fig. 9 is a vertical sectional view taken on the line 9—9 of Fig. 7 and illustrates the preferred cam mechanism for controlling the operation of the web feed rolls and the reciprocatory carriage.
Figure 10:
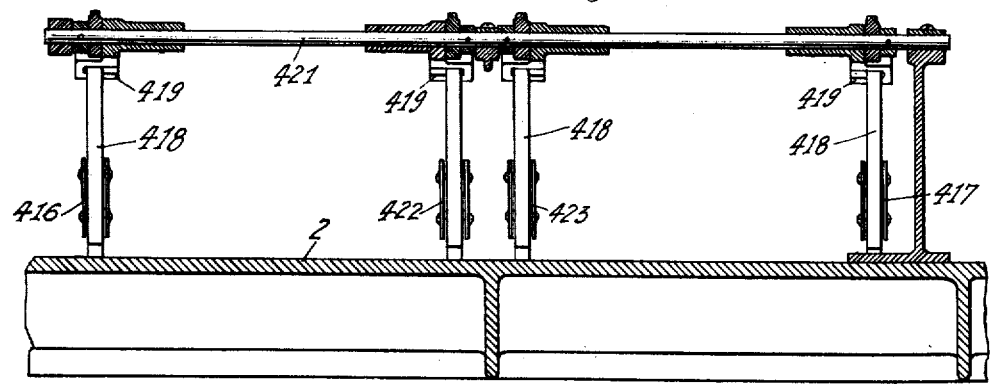
Fig. 10 is a similar view but taken on the line 10—10 of Fig. 7.

As shown in Fig. 9, the outer end portion of the arm 194 co-acts with a bevelled edge 195 of a cam plate 196 constituting stop means therefor, whereby the angular movement of the arm 194 and, consequently, the extent of movement of the bell-crank lever 167 and the web feed rolls 157 and 158 operated thereby may be limited. Conveniently, the cam plate 196 is mounted for angular adjustment on a supporting member 197 carried by a reciprocatory rod 198 suitably mounted in spaced bearings 199 positioned substantially in the center of the machine near the front edge of the bed plate 2.

Figure 18:
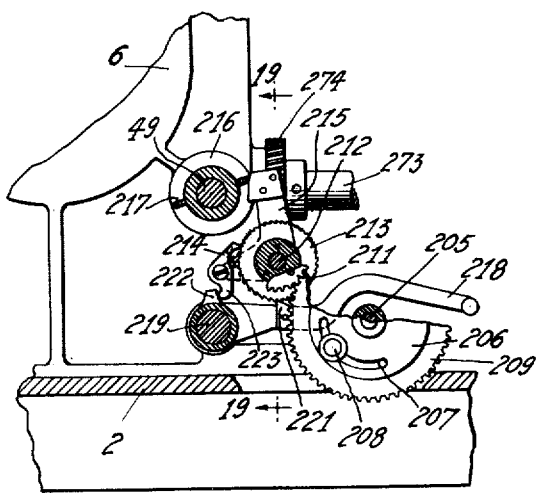
Fig. 18 is a detail, vertical sectional view illustrating the preferred actuating means for the angularly-adjustable frame and the cam-control mechanism for the carriage and web-feeding rolls, the sectional plane being taken on the line 18—18 of Fig. 11.
Figure 19:
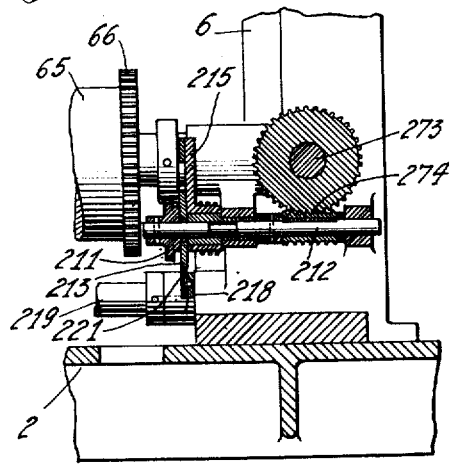
Fig. 19 is a vertical sectional view taken on the line 19—19 of Fig. 18.

Suitable means are herein provided for automatically stepping the cam plate 196 bodily to the left, as viewed in Fig. 9, throughout the operation of the machine, said means comprising a bar 201, one end of which is secured to the rod 198 while the other end is slidably mounted in a support 202. The adjacent end of the bar 202 is provided with gear teeth 203, forming a rack which meshes with a pinion 204 mounted on a shaft 205. As shown in Figs. 1, 18 and 19, the shaft 205 extends forwardly to a point near the front edge of the table 2 and terminates in a plate 206 provided with a pair of angular slots 207. A pair of bolts 208 respectively extend through these slots to a gear-wheel 209, whereby the latter may be adjustably clamped to the plate 206. Hence, if it is desirable to adjust bodily the position of the cam 196 relatively to the crank arm 194, this may be done merely by loosening the bolts 208 and turning the plate 206.

As shown in Figs. 18 and 19, the gear-wheel 209 meshes with a gear-wheel 211 which is rigidly secured to a shaft 212 journaled in suitable bearings provided by the winding head 6. The gear-wheel 211 carries a ratchet-wheel 213 which co-acts with a spring-pressed actuating pawl 214 carried by one arm of a spring-tensioned bell-crank lever 215 pivotally mounted on the shaft 212. Another arm of the bell-crank lever 215 is positioned in operative relation to a cam 216 mounted on the cross shaft 49 and provided with a pair of actuating shoulders 217. A spring-tensioned hand lever 218 is pivotally mounted at 219 and is provided with a holding pawl 221 for the ratchet wheel 213. The lever 218 is provided with a shoulder 222 which co-acts with a tail portion 223 of the spring-pressed pawl 214, so that, when the hand lever 218 is depressed and its holding pawl 221 is disengaged from the ratchet-wheel 213, the spring-pressed pawl 214 is also disengaged from the ratchet-wheel 213, permitting the shaft 212 to turn under the weight of the angularly-adjustable frame 32 and return the cam 196 to its original position, as will presently appear in greater detail.

Hence, the rotation of the cross shaft 49, through the pawl-and-ratchet mechanism just described, causes the movement of the cam stop 196 step-by-step to the left, as viewed in Fig. 9, throughout the whole operation of the machine. Each adjustment in the position of the cam stop 196 permits an increase in the extent of movement of the crank arm 194 before it engages the cam stop 196 and, consequently, an increase in the period of operation of the web feed rolls 157 and 158, resulting in an increased amount of paper being fed forwardly through the web-severing means. If it is desirable to vary the increments of paper length, this may be accomplished, without releasing the bolts 208 shown in Fig. 1, merely by angularly adjusting the cam stop 196 on its supporting member 197.

Coming next to the common severing means for the pair of webs, which are delivered thereto in side-by-side relation by the feeding rolls 157 and 158, as shown in Figs. 7, 8, 31 and 34, this means may conveniently comprise an elongated member 224 which is guided at its opposite ends for vertical reciprocatory movement on a pair of vertical plates 225 and 226 and which is centrally supported on a post 227. This post is supported in a frame 228 carrying a pair of spaced bearings 229. The post preferably extends downwardly through the bed plate 2 and is supported on an inner end 231 of a hand lever 232 which is pivotally mounted at 233. An outer end 234 of the lever 232 is adapted to serve as a handle and is positioned at the front edge of the bed plate 2 near the center of the machine. A set screw 235, which extends from the outer arm of the lever 232 into engagement with an abutment 236 on an adjacent portion of the bed plate 2, permits variations in the lower position of the post 227. The hand lever 232 is normally held, so that its set screw 235 engages the abutment 236 not only by the weight of the post 227 and parts supported thereby, but also by means of a spring 237. The action of the spring 237 may be supplemented by a spring 238 which encircles the portion of the post 227 below the bed plate 2, one end abutting against the frame 228 and the other end engaging an adjustable collar 239 on the post 227.

Conveniently, a lower knife 241 may be spring mounted on an upper front surface portion of the elongated member 224 so as to co-operate with an upper knife 242, which is suitably supported just above the lower knife 241 but in such spaced relation thereto that the pair of webs may pass therebetween from the feed rolls 157 and 158. The upper knife 242 is mounted on an elongated supporting member 243 which is positioned in spaced relation to a web-supporting plate 244. This plate extends across the full width of the angularly-adjustable frame 32 between the pair of feed rolls 157 and 158 and the co-acting knives 241 and 242.

The lower knife 241 may be automatically raised and lowered with respect to the upper knife 242 by means of a gear-wheel sector 245 which co-acts with teeth 246 formed on the portion of the post 227 between the spaced bearings 229. The gear-wheel sector 245 is mounted on a rock shaft 247 to which is secured a crank arm 248 having a roller 249 adapted to co-act with an actuating cam 251 mounted on the main cam shaft 126. This cam is so designed that the lower knife 241 is raised immediately after the feeding operation of the feed rolls 157 and 158 so as to sever sheets of paper from the pair of webs extending forwardly from these rolls. It will be observed that the lower knife 241 may also be raised by the hand lever 232.

Figure 8:
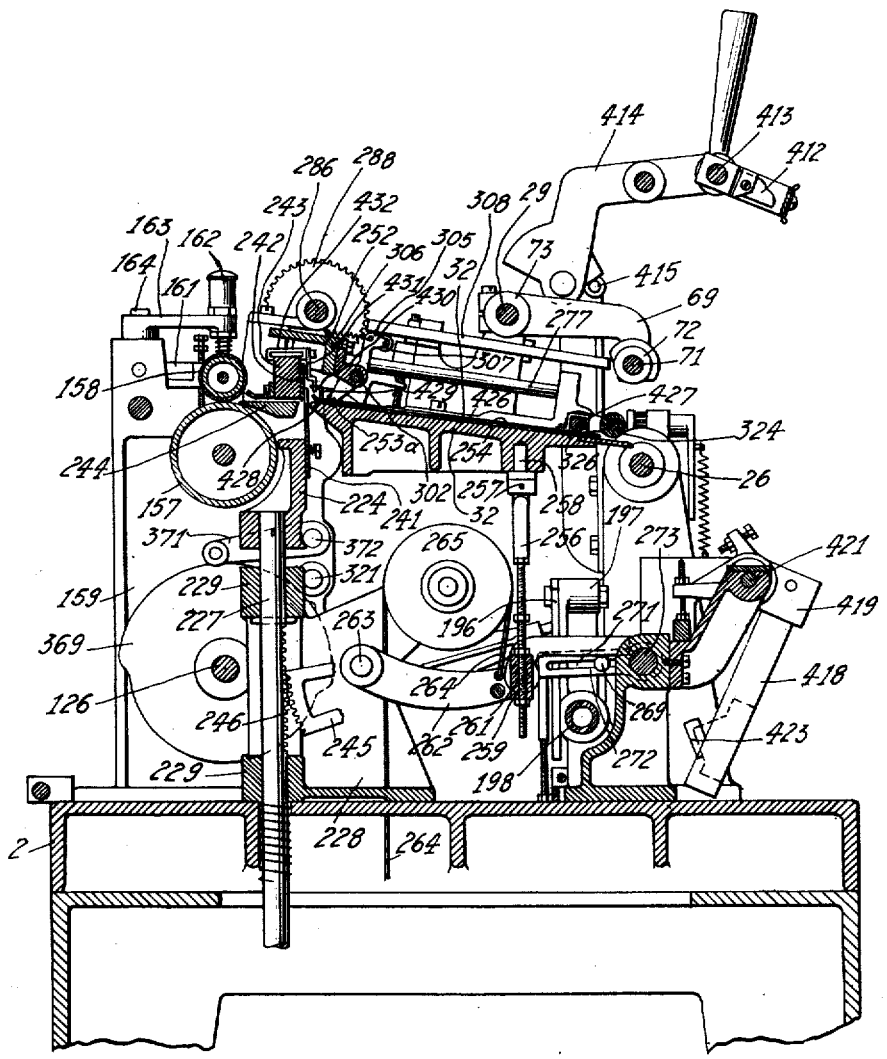
Fig. 8 is a similar view but looking toward the right hand half of the machine, the sectional plane being taken on the line 8—8 of Fig. 1.

Coming next to the transfer means, whereby the severed sheets of paper may be moved forwardly from the knives 241 and 242 and delivered to the winding spindle 26, as shown in Figs. 3 to 9, inclusive, 11, 12, 22 to 25, inclusive, and 32 to 35, inclusive, said means comprises the angularly-adjustable frame 32; a reciprocatory carriage 252, which is provided with a pair of sheet-actuating members 253 and 253a for the pair of severed sheets; and means for successively feeding at relatively slow and rapid rates the sheets advanced by the carrier, final injection into the coils occurring at said rapid rate which preferably is equal to or greater than the surface speed of the coils. The angularly-adjustable frame 32 is conveniently formed of a single casting having a smooth upper surface 254 over which the sheets may readily pass toward the winding spindle 26. The frame is hinged adjacent to the rear edge thereof on pins 255 as shown in Fig. 35, while the front edge is adjustably supported by means of a vertical rod 256, as shown in Figs. 7 and 8.

The upper end of the rod 256 is pivotally secured at 257 to a member 258 rigidly secured to the under side of the angularly-adjustable frame 32. The lower end of the rod 256 is in threaded engagement with a member 259 which is pivotally secured at 261 to a lever 262 pivoted at 263 on an adjacent portion of the machine. A flexible element 264 extends vertically from the lever 262 around a pulley-wheel 265 and then downwardly to a weight 266, as shown in Fig. 4, whereby the angularly-adjustable frame 32 may be counter-balanced. Conveniently, the weight 266 may be connected by a flexible element 267 to a foot-treadle 268 so as to permit the manual raising and lowering of the angularly-adjustable frame 32.

As shown in Figs. 1, 8 and 32, an outer end of the lever 262 is supported on one end of a bolt 269 which is mounted for longitudinal adjustment in a slot 271 formed in a crank arm 272. The crank arm 272 is secured to one end of a shaft 273 which is suitably supported at the front of the machine. The other end of the shaft 273 is connected, as shown in Figs. 11 and 19, through worm-and-wheel mechanism 274 to the shaft 212. The worm-and-wheel mechanism 274 is so designed as to be reversible under the weight of the angularly-adjustable frame 32, for reasons as will presently appear.

When the cross shaft 49 is turned, the shafts 212 and 205 are intermittently actuated through the pawl-and-ratchet mechanism shown in Figs. 18 and 19. The actuation of the shaft 205 causes the progressive movement of the cam stop 196 to the left as viewed in Fig. 9, with a resulting gradual increase in the amount of paper fed forwardly through the severing means, and, hence, in the length of the sheets delivered to the winding spindle 26. The operation of the shaft 212 through the worm-and-wheel mechanism 274 causes the intermittent turning of the shaft 273 and the crank arm 272 with its supporting bolt 269. This movement of the bolt 269 through the lever 262 and the vertical rod 256 is imparted to the angularly-adjustable frame 32. In this manner, the angularly-adjustable frame 32 is intermittently raised throughout the operation of the machine in accordance with the increase in the diameter of the coils under formation on the winding spindle 26. Should it be desirable to return the angularly-adjustable frame 32, as well as the cam stop 196, to the position assumed at the start of a coil-winding operation, it is necessary only to depress the lever 218 shown in Fig. 18, so as to disengage the holding pawl 221 from the ratchet-wheel 213. This movement also causes the disengagement of the spring-pressed pawl 214 from the ratchet-wheel 213, with the result that the shaft 212 is free to turn under the weight of the angularly-adjustable frame 32. The turning of the shaft 212 through the gear-wheels 209 and 211 causes the actuation of the shaft 225, with the result that the cam stop 196 is returned to its original starting position which may be determined by suitable stop means (not shown).

Referring to the sheet-transfer means and, more especially, the reciprocatory carriage 252 with its pair of sheet-actuating members 253 and 253a, as shown in Figs. 6, 7, 8, 22, 31 and 35, said carriage conveniently comprises an elongated member 275 which extends across the width of the angularly-adjustable frame 32 and is provided at its ends with bearings 276 which are slidably mounted on supporting rods 277. These rods are mounted at their ends in suitable supporting means carried by the angularly-adjustable frame 32. The carriage 252 may be conveniently reciprocated over the sheet-supporting surface 254 of the angularly-adjustable frame 32 by means, such, for example, as are shown in Figs. 3, 11, 12, 31 and 35, wherein a cam 278 is mounted on the left hand end of the main cam shaft 126 immediately adjacent to the bevel gearing 127. A bell-crank lever 279, which is pivotally mounted on a rock shaft 281 carried by the adjacent vertical supporting plate 159, has a lower arm positioned to be actuated by the cam 278, while an upper arm 282 is provided with gear teeth adapted to mesh with a gear-wheel 283 suitably supported on the adjacent vertical side plate 159.

The gear-wheel 283 is conected by a gear-train 284 to a gear-wheel 285 which is mounted on a shaft 286 journaled in suitable bearings carried by the angularly-adjustable frame 32. The gear-wheel 285 meshes with a rack 287 which is secured to the adjacent end of the carriage 252. The shaft 286 may be extended across the width of the angularly-adjustable frame 32 and it is provided with a gear-wheel 288 which meshes with a rack 289 secured to the opposite end of the carriage 252. Thus, upon the operation of the bell-crank lever 279 by the cam 278, the gear-wheels 285 and 288 are turned, causing through their co-acting racks 287 and 289 the movement of the carriage 252. The cam 278 is so designed as to cause a forward movement only of the carriage 252, said movement occurring subsequent to the operation of the web-severing means and before the traverse bar 29 has reached the end of its stroke. The return movement of the carriage 252 is preferably effected by means of a source of power separate from the main power source 1 of the machine, and may take the form of a weight 291, as shown in Fig. 35. The weight 291 is connected to the carriage 252 by means of a flexible element 293 which extends vertically around a guide pulley 294 and then horizontally to, say, a point 295 on the gear-wheel 285. It is noted that the maximum period during which the weight 291 is effective to cause the actuation of the carriage 252 is determined by the falling portion of the cam 278.

The gradual increase in the diameter of the coils, as they are formed on the spindle 26, necessitates sheets of progressively increasing length, and means have been set forth above whereby this result may be accomplished. Illustrative means will now be described for automatically adjusting the sheet-transfer means in accordance with the increase in length of the sheets supplied thereto. As shown in Fig. 9, the rock shaft 281, upon which the bell-crank lever 279 is mounted, is extended inwardly toward the center of the machine and provided with a forwardly extending crank arm 296 which is similar to the crank arm 194. The arm 296 is adapted to co-act with a beveled edge 297 of a cam plate 298 which constitutes a stop therefor, limiting the return movement of the gear-sector arm 282 and, consequently, that of the carriage 252. The cam stop 298 is suitably mounted on a supporting member 299 rigidly secured to the rod 198 so as to be movable bodily with the cam stop 196 as the latter is actuated by the cross shaft 49 and connected pawl-and-ratchet mechanism shown in Fig. 18. It will be observed that the beveled edge 297 of the cam stop 298 is oppositely disposed with respect to the beveled edge 195 of the cam stop 196, so that the simultaneous movement of the two cam stops causes an increase in the movement of the crank arm 194 and a corresponding decrease in the movement of the crank arm 296. Conveniently, the cam stop 298 is mounted on the supporting member 299 for angular adjustment so as to permit variations in the decrement of carriage travel independently of the actuating rod 198 and the cam stop 196.

In operation, upon the counter clock-wise rotation of the cam 278, shown in Fig. 12, the bell-crank lever 279 and connected gear-wheel mechanism is actuated so as to cause the forward movement of the carriage 252. When the carriage 252 has reached the end of its forward stroke, the cam 278 has moved into a position permitting the weight 291 to move the carriage 252 rearwardly. Such rearward movement continues until the crank arm 296 engages the beveled edge 297 of the cam stop 298. At the same time, the crank arm 194 engages the beveled edge 195 of the cam stop 196, preventing the further actuation of the feed rolls 157 and 158 by the weight 182. This cycle of operations is repeated throughout the whole operation of the machine, but it will be noted that the arms 296 and 194 successively engage higher and lower points on the cam edges 297 and 195, respectively, due to the intermittent bodily movement of the cam stops to the left, as viewed in Fig. 9, by the cross shaft 49 and connected mechanism shown in Figs. 9 and 18.

Referring to the pair of sheet-actuating members 253 and 253a shown in Figs. 5, 6, 9 and 22, it will be observed that these members, which may take the form of a rod having a covering of resilient friction material, such as rubber, are respectively positioned directly over the pair of webs extending forwardly from the feed rolls 157 and 158. Conveniently, the opposite ends of each of these rods are rigidly secured to a pair of spring-pressed arms 301 which are loosely mounted on a rock shaft 302 extending across the width of the angularly-adjustable frame 32 and suitably supported thereon. As shown particularly in Fig. 6, each of the arms 301 is provided with an adjustable abutment 303 which engages the outer end of a crank arm 304 rigidly secured to the rock shaft 302. Thus, the rods 253 and 253a may be raised vertically out of frictional engagement with the pair of webs merely by turning the rock shaft 302.

Suitable means are provided for turning the rock shaft 302 so as to raise and lower the pair of sheet-engaging rods, the same being shown particularly in Figs. 9, 22, 32, 33 and 34, wherein it will be noted that the right hand end of the rock shaft 302 terminates in a crank arm 305 which is normally held in a raised position by a spring 306, permitting the actuating rods 253 and 253a to engage the adjacent webs of material under the force of the spring-pressed arms 301. The crank arm 305 is provided with a roller 307 which engages the underside of a rod 308 extending between the front and rear edges of the angularly-adjustable frame 32. The rod 308 is rigidly secured to a pair of arms 309 pivoted on a shaft 311 supported on an adjacent stationary portion of the machine, and it is movable into a raised position under the force of the spring-pressed crank arm 305. The rod 308 may be lowered from said raised position so as to move the crank arm 305 downwardly against the force of the spring 306 by means of a vertically movable pin 312, an upper end of which engages a projecting end portion of one of the arms 309. The lower end of the pin 312 engages an upper arm of a bell-crank lever 313, the lower arm of which is connected to a spring 314 tending to move said upper arm away from the vertical pin 312. A link 315 is connected to the lower arm of the bell-crank lever 313 and is provided with a longitudinal slot 316 adapted to receive a supporting and guiding pin 317. The free end of the link 315 engages a vertical arm 318 which is tensioned by a spring 319 so as to tend to move away from the link 315. The arm 318 is rigidly secured to a rock shaft 321 which extends through an adjacent portion of the vertical side plate 159 and terminates at its inner end in a rearwardly-extending crank arm 322 adapted to co-act with a cam 323 mounted on the main cam shaft 126.

Thus, the turning of the cam 323 through the mechanism just described, causes the raising of the vertical pin 312 and the consequent lowering of the rod 308. This results in a downward movement of the crank arm 305 against the force of the spring 306 and the turning of the shaft 302, causing an upward movement of the sheet-actuating rods 253 and 253a out of engagement with the adjacent webs. Upon the continued turning of the cam 323, an opposite movement of the rock shaft 302 occurs under the force of the spring 306, so that the actuating rods 253 and 253a are lowered into their effective sheet-engaging position. The cam 323 is designed so that the sheet-actuating rods engage the webs just prior to the operation of the web-severing means, remaining in this effective position throughout the forward stroke of the carriage 252, whereupon the rods are raised into their ineffective position and held therein while the carriage traverses its return stroke and the web-feeding rolls 157 and 158 are operating.

Referring to the sheet-transfer means and, more especially, the accelerator means or mechanism, whereby the sheets may be actuated into the coils under formation on the winding spindle at a speed which is preferably equal to or greater than the peripheral speed of said coils, as shown in Figs. 6, 7, 9, 11, 22, 24 and 25, said accelerator means comprises a roll 324 which is positioned at the front edge of the angularly-adjustable frame 32 and is extended across the width thereof. The accelerator roll 324 is supported at its ends on a pair of arms 325 which are loosely mounted on a rock shaft 326 suitably supported on the angularly-adjustable frame 32. As shown in Fig. 9, the left hand end of the rock shaft 326 is provided with a portion 327 of reduced diameter which extends into a recess formed in a shaft section 328 so as to be supported thereby. The shaft section 328 is suitably supported on the adjacent portion of the angularly-adjustable frame 32. The inner end of the shaft section 328 is provided with a spring-pressed pawl 329 which co-acts with a ratchet-wheel 331 rigidly secured to the rock shaft portion 327, as shown in Figs. 6, 9 and 24. A gear-wheel 332 is secured to said rock shaft portion 327, and it meshes with a gear-wheel 333 mounted on the adjacent end of the accelerator or feed roll 324, as shown in Figs. 6 and 25.

The outer end of the shaft section 328 has secured thereto a gear-wheel 334 which meshes with a gear-wheel sector 335 constituting one arm of a bell-crank lever 336 pivotally mounted at 337 on the angularly adjustable-frame 32, as shown in Fig. 12. The other arm of the bell-crank lever 336 has secured thereto a spring 338 tending to hold an adjustable abutment 339, which is carried by this arm, in engagement with the angularly-adjustable frame 32. Thus, the movement of the gear-wheel sector 335 against the force of the spring 338 causes the spring-pressed pawl 329 to turn its co-acting ratchet-wheel 331, which movement is imparted to the accelerator roll 327 through the pair of gear-wheels 332 and 333.

The operation of the gear-wheel sector 335 so as to cause the rapid feeding of the sheets into the coils under formation on the spindle 26 is conveniently effected as shown in Fig. 7, wherein it will be noted that an actuating arm 341 is supported on a rock shaft 342, so that a roller 343, which is mounted on the free end of said arm, engages an adjacent edge of the gear-wheel sector 335 at a point spaced from the pivotal supporting point 337 of said sector. The rock shaft 342 has secured thereto an arm 344 which is provided with a pair of adjustable abutments 345 and 346 adapted to receive therebetween a pin 347 carried by a link 348. The link 348 is connected by a link 349 to a vertically positioned core 350 of an electromagnet 351. The adjustable abutments 345 and 346 permit variations in the position of the core 350 independently of the arm 341. The lower position of the core is determined by an adjustable bolt 352 carried by the link 348. The electromagnet 351 is so designed as to cause the actuation of the accelerating roll 324 at a speed which is approximately equal to or greater than the peripheral speed of the coils under construction. As a result of such high-speed injection, there is a decrease in the tension on the paper at the time of contact with the wires and the coils. In addition, slippage of the paper before it is entirely gripped by the wires is prevented.

Suitable control means are provided for the electromagnet 351 adapted to cause the operation of the same when the traverse bar 29 reaches the end of its stroke, the same being shown in Figs. 6, 13 and 16. In these figures, it will be observed that a pair of threaded rods 353 and 354 are horizontally mounted for axial adjustment in a portion 355 of the block 43. Each of these rods is positioned in alignment with a gear-wheel sector 356 which co-acts with a gear-wheel 357 secured to a rotary switch member 358 carrying a contact element 359. Each of the rotary members 358 is tensioned by means of a spring (not shown), so that the contact element 359 is normally out of engagement with a co-acting stationary contact element 361. The parts are so adjusted that when the traverse cam 48 actuates the traverse rod 34 and connected traverse bar 29, say, to the left, as viewed in Fig. 13, the adjustable rod 353 engages the adjacent gear-wheel sector 356, causing the turning of the drum 358 and the actuation of the contact element 359 into engagement with the co-acting stationary contact element 361 at about the end of the stroke of the traverse bar 29. The electromagnet 351 then operates to cause the actuation of the accelerator roll 324 and the consequent injection of the sheets into the coils at a high rate of speed. When the traverse rod 34 and traverse bar 29 are actuated in the opposite direction, the remaining adjustable rod 353 causes the turning of the other drum and the actuation of the contact element carried thereby into engagement with its co-acting stationary contact element when the traverse bar 29 has reached the end of its opposite stroke, whereupon the sheets are fed rapidly into the coils by the accelerator roll 324.

In the operation of the accelerator roll 324 by the electromagnet 351, it is desirable that the forward movement of the paper by this roll be reduced to a minimum, so that the paper may be rapidly injected into the coils at just the proper moment. To this end, means are provided whereby the sheets of paper may be advanced beyond that effected by the carriage 252, to a position wherein the front edge of said sheets is positioned just out of the bite of the coils. The said means may take the form shown in Figs. 7, 11 and 12, wherein a cam 362 which is mounted on the main cam shaft 126 co-acts with an arm 363 of a bell-crank lever 364 pivotally mounted at 365. A spring 366 serves to cause the arm 363 to engage the cam 362. The other arm of the bell-crank lever 364 is connected by means of a vertically adjustable rod 367 to an arm 368 which is rigidly secured to the rock shaft 342 carrying the arm 341. The cam 362 is so designed as to cause the arm 341 to turn the gear-wheel sector 335 and, hence, the accelerator roll 324 immediately following the end of the feeding stroke of the carriage 252 and before the energization of the electromagnet 351. The feeding movement thus imparted to the paper at this time by the accelerator roll 324 is relatively slow compared with that subsequently imparted by the electromagnet 351.

As the angularly-adjustable frame 32 rises during the operation of the machine in order to compensate for the increase in coil diameter, the distance between the front edge of said angularly-adjustable frame and the point of tangency of the wires on the coils, that is, the bite, also increases. As a result, it is necessary to increase correspondingly the extent of operation of the accelerator roll 324 by the cam 362. This condition is met in the present invention by mounting the gear-wheel sector 335 on the frame 32 and the co-acting arm 341 on a stationary part of the machine, so that the point of contact of the arm 341 on the gear-wheel sector 335 automatically moves toward the pivotal supporting point 337 for said gear-wheel sector with each vertical adjustment of the frame. There is thus a progressive decrease in the effective lever arm of the gear-wheel sector. Consequently, with each vertical adjustment in the position of the frame 32, the gear-wheel sector 335 is turned through a larger angle, thereby feeding the sheets of paper forwardly a greater distance. Moreover, the rate of feed is increased, inasmuch as the gear-wheel sector 335 turns through a larger angle in the same interval of time. It will also be observed that the decrease in the effective lever arm of the gear-wheel sector 335 results in an increase in the extent as well as the rate of operation of the accelerator roll 324 when it is actuated by the electromagnet 351, thereby compensating for the gradual increase in the peripheral speed of the coils.

Since it is necessary that the accelerator roll 324 be held out of engagement with the sheet-supporting surface of the angularly-adjustable frame 32 when the sheets are fed forwardly by the carriage 252, suitable means are provided for accomplishing this desired result. As shown in Figs. 4, 31, 32 and 34, this means comprises a cam 369 which is mounted on the main cam shaft 126 immediately adjacent to the cam 323 for raising the pair of sheet-actuating rods 253 and 253a. The cam 369 co-acts with an arm 371 mounted on a crank shaft 372 which extends through an adjacent portion of the vertical side plate 159 and terminates in a crank arm 373. The free end of this arm engages an adjacent end of a horizontally positioned link 374 which is provided with a longitudinal slot 375 adapted to receive the supporting and guiding pin 317 shown in Figs. 32 and 34. The remaining end of the link 374 is connected to an arm 376 rigidly secured to an adjacent end of the rock shaft 326. A spring 377 is connected to the link 374 so as to tend to actuate the same rearwardly into engagement with the crank arm 373.

As shown in Figs. 6, 22 and 25, the rock shaft 326 is provided with a pair of crank arms 378 which are positioned to extend under adjustable abutments 379, respectively carried by the supporting arms 325 for the accelerator roll 324. The arrangement is such that when the pair of crank arms 378 are raised by the turning of the rock shaft 326, the arms 325 are similarly raised, carrying with them the accelerator roll 324. The cam 369 is so designed as to cause the raising of the accelerator roll 324 prior to the forward feeding movement of the carriage 252, and, immediately following this movement, the lowering of the accelerator roll into frictional engagement with the advanced sheets of paper.

In accordance with the present invention, means are provided, whereby the speed of the winding spindle 26 may be decreased while the sheets are being injected into the coil and while the direction of the stroke of the traverse bar 29 is being changed. As shown in Figs. 28 and 29, this desired result may be effected automatically by means of a cam 381 which is mounted on the main cam shaft 126 immediately adjacent to the left hand vertical supporting plate 159. The cam 381 co-acts with a roller mounted on one arm of a bell-crank lever 382 pivotally mounted on a stud 383 suitably supported on the table 2. The other arm of the bell-crank lever 382 extends downwardly through an opening in the table 2 and is adjustably connected at its lower end by a link 384 to a crank arm 385 rigidly secured to the rock shaft 16. The crank arm 385 is also connected by a link 386 to the crank arm 15, as shown in Fig. 7. The cam 381 is so designed that the brush mechanism 23 is actuated as the traverse bar approaches the end of its stroke to cause a gradual decrease in the speed of the motor 1, reaching a minimum at about the end of the traverse bar stroke, following which the brush mechanism is permitted to return gradually to its original position under the force of the spring 24 as the traverse bar starts moving through its opposite stroke.

The proper feeding of the sheets into the coils, as well as the reversal of the stroke of the traverse bar 29 without undesirable overlapping of the wire on the coils, is further assured in the present invention by means which may take the form shown in Figs. 2, 3, 13, 14, 16 and 17. As therein shown, said means comprises an actuating cam 387 which is mounted on the cross shaft 49. This cam is provided with a groove 388 adapted to receive a roller 389 mounted on a crank arm 391 of a shaft 392 suitably supported on the table 2. The shaft 392 carries a crank arm 393 to which is rigidly secured a link 394. The link 394 is adjustably connected to a link 395 extending to a gear-wheel sector 396. The gear-wheel sector 396 meshes with a gear-wheel 397 which is splined to the traverse rod 34 and secured against axial movement by a yoke 398, as shown in Figs. 13 and 14. The traverse rod 34 is provided with a threaded portion 399 positioned in a threaded aperture 401 formed in the block 43 which thus serves as a nut for said rod. Hence, when the cam 387 is turned, the crank arm 391 is rocked, and this movement is timed to occur when the traverse bar 29 reaches the end of its stroke, thereby causing the movement of the gear-wheel sector 396. The movement of this sector causes the turning of the gear-wheel 397 and with it the traverse rod 34. Due to the threaded connection between this rod and the block 43, the traverse rod 34 and the traverse bar 29 have imparted thereto momentarily a longitudinal movement which is in addition to that caused by the traverse cam 48 and its connected actuating lever 36. The extent of this additional movement may be varied at the adjustable connection between the links 394 and 395.

The present invention contemplates still further means for assuring the proper building-up of the coils on the winding spindle 26. As shown in Figs. 1, 8 and 9, said means preferably takes the form of speed-control mechanism which is adapted to prevent an undesirable increase in the speed of the travelling wire at the coils as the diameter thereof increases. To this end, the lever 262, which is connected with the angularly-adjustable frame 32 by the rod 256, is provided with a post carrying on its outer end a depending rod 403. This rod extends through an opening in the table 2, and it is secured at its lower end to a block 404, which is adjustably secured by bolts 405 to a crank arm 406, whereby the effective length of said crank arm may be varied. This crank arm is mounted on one end of a rock shaft 407, an opposite end of which is provided with a crank arm 408 positioned so as to engage a shoulder 409 extending from a vertical crank arm 411 rigidly secured to the rock shaft 16 and constituting a part of the brush-shifting mechanism. The arm 408 engages the side of the shoulder 409 so as to actuate the brush mechanism 23 progressively, in a direction from its normal running position, in accordance with the gradual raising of the lever 262 by the mechanism shown in Figs. 8, 18 and 19. Thus, as the angularly-adjustable frame 32 is automatically raised throughout the operation of the machine, in order to compensate for the increase in diameter of the coils under formation on the winding spindle 26, the arm 408 actuates the brush mechanism 23 so as to decrease progressively the maximum running speed of the machine and, hence, that of the spindle 26. It will be noted that there is a lost-motion connection between the arm 408 and the shoulder 409, permitting the independent operation of the brush mechanism 23 into its neutral position by the foot-pedal 8 from any one of the advanced positions established by the arm 408.

During the building-up of the coils on the spindle 26, a plurality of knives 412, shown in Figs. 1 and 7, may be brought periodically into engagement with the paper between adjacent coil layers, so that the coils may be quickly separated upon completion. The knives 412 are conveniently mounted on a bar 413 positioned just above and in front of the winding spindle. The ends of the bar 413 are supported on arms 414 suitably mounted for pivotal movement, whereby the knives 412 may be moved into and out of their effective cutting position. A releasable locking pin 415, Fig. 8, which is positioned in engagement with one of the arms 414, serves normally to hold the knives in their raised ineffective position.

When the construction of the coils has been completed, it is desirable to remove the excess paper adjacent to the ends of the winding spindle. This may be readily accomplished by means of a pair of knives 416 and 417, shown in Figs. 1, 6, 10 and 22. As therein illustrated, each of the knives is mounted on an elongated bar 418, an upper end of which is pivotally mounted between the arms of a U-shaped member 419 rotatably carried by a rod 421 extending across the front of the machine and suitably journaled at its ends on bearings carried by the table 2. If two so-called "sticks" of coils are desired instead of one, an additional pair of knives 422 and 423 are provided. These knives are supported similarly to the knives 416 and 417 but are positioned at the center of the machine, whereby the excess paper may be removed from the adjacent ends of said "sticks" of coils.

In adjusting the machine for operation, the control means for the web-feeding rolls 157 and 158 are first adjusted, so that sheets of the desired minimum length may be obtained. Accordingly, the hand-lever 189 shown in Fig. 4 is actuated to cause the disengagement of the clutch element 173 shown in Fig. 31 from its co-acting clutch element 177. The feed rolls 157 and 158 are now turned, say by a hand-wheel 424 mounted on the extension of one of these rolls, so as to feed webs of paper forwardly between the pair of knives 241 and 242. The extent of movement necessary to obtain sheets of the desired minimum length may be conveniently determined as shown in Fig. 22, wherein a scale 425 is mounted on the upper side of the angularly-adjustable frame 32 immediately adjacent to the right hand edge thereof. If, for example, a 5 inch sheet is desired, the feed rolls 157 and 158 are turned until the front edge of the webs is in alignment with the mark "5" on said scale.

The bolts 208 shown in Fig. 18 are now loosened to permit the bodily adjustment of the bar 201 and rod 198 with its cam stops 196 and 298 independently of the gear-wheel 209. When the cam stop 196 has been actuated into engagement with the crank arm 194, the bolts 208 are tightened. The cam stop 196 is next adjusted angularly so as to provide the desired increments in paper length throughout the operation of the machine. The carriage 252 is next positioned, so that its stroke is sufficient to freed forwardly the required distance sheets having the minimum length just determined, whereupon the cam stop 298 shown in Fig. 9 is bodily adjusted until the edge 297 thereof engages the arm 296. This cam is next adjusted angularly to provide for the gradual decrease in the stroke of the carriage 252 required by the gradual increase in the length of the sheets. The locking member 193 shown in Fig. 4 is now raised to permit the hand-lever 189 to be moved into its ineffective position, permitting the engagement of the clutch elements 173 and 176.

Assuming the machine at rest, the actuation of the foot-pedal 8 causes the movement of the brush mechanism 23 from the normal running position to the advanced neutral position, wherein the motor 1 remains at rest even though energized. Upon this movement of the brush mechanism 23, the crank arm 17 engages the shoulder 21 of the vertical rod 18 shown in Fig. 7, causing the movement of the arm 22 from the solid-line position to the dot-and-dash line position. Such movement permits the spring-pressed switch element 7 to move into its outer circuit-closing position, causing the energization of the driving motor 1, but since the brush mechanism 23 has previously been advanced to the neutral position, the motor 1 remains at rest.

When the foot-pedal 8 is released, the brush mechanism 23 under the force of the spring 24 tends to return to the normal running position, but such movement is retarded by the door check 13, with the result that the motor 1 starts slowly from rest and accelerates gradually to the maximum driving speed. In this manner, the initial load on the wires due to the starting operation is materially decreased. A further decrease is effected by the wire-tensioning means associated with the spools 81 due to the movement of the tension rods 85 during the starting operation from the solid-line position shown in Fig. 20 to the dot-and-dash line position. During this movement of the tension rods 85, the brake shoes 94 are so moved as to decrease or entirely eliminate the braking effect thereof on the spools 82.

In the meantime, following the release of the foot-pedal 8, the traverse cam 48 causes the actuation of the traverse bar 29 through its stroke, so that a plurality of single layers of wire are simultaneously wound on the spindle in separated zones. In the particular machine illustrated, eighteen such separate layers are wound, of which nine are in alignment with the sheet-actuating bar 253, and the remaining nine are in alignment with the sheet-actuating bar 253a.

While the traverse bar 29 has been completing its stroke, measured sheets of windable material of sufficient length to extend at least once around the first layer of wire have been fed forwardly ready for injection into the coils at about the end of said stroke. The several steps leading up to the delivery of these measured sheets to the coils are as follows: the cam 184 first moves so as to permit the engagement of the clutch elements 173 and 176. The weight 182 then turns the pair of feed rolls 157 and 158 so as to feed forwardly between the knives 241 and 242 and onto the frame 32 webs of paper from the supply previously withdrawn from the web rolls 96 and 97 by the draw bars 121 and 139, respectively. This forward movement continues until the front edges of the webs are in alignment with the desired mark on the scale 425, at which time the arm 194 engages the cam stop 196, preventing the further operation of the feed rolls 157 and 158. The pair of sheet-actuating rods 253 and 253a, which during this feeding movement were positioned in spaced relation to the angularly-adjustable frame 32, are now permitted to drop by the cam 323 into engagement with the adjacent webs of paper, said rods moving into this position under the force of the spring 306.

Next, the cam 251 shown in Fig. 7, through the crank arm 248, the gear-wheel sector 245 and the vertical post 227 causes the raising of the knife 241 relative to the knife 242 and the consequent cutting of the pair of webs to form the desired sheets of minimum length.

Following the feeding operation of the pair of rolls 157 and 158, the actuating shoulder 128 of the cam 125, shown in Figs. 23, 26 and 27, causes the raising of the rod 132 and, consequently, the release of the main brake shoes 105 and 136 and the setting of the latches 115 and 138 in their holding position. At the same time, the brake shoes 144 and 145 are actuated by the shoulder 155 of the cam 156 into engagement with their respective brake drums 104 and 135 and are held in this position while the actuating shoulder 128 is in engagement with the roller 129 on the bell-crank lever 131. Upon the continued movement of the main cam shaft 126, the shoulder 155 is disengaged from the spring-tensioned bell-crank lever, permitting the brake shoes 144 and 145 to be actuated thereby into their ineffective position. The draw bars 121 and 139 now drop from their elevated position, into which they have been previously raised by operation of the feeding rolls 157 and 158, until the desired supply of paper has been withdrawn from the rolls 96 and 97, whereupon they cause the tripping of the latches 115 and 138. This permits the movement of the spring-pressed brake shoes 105 and 136 into holding engagement with the drums 104 and 135 and, consequently, prevents the overtravel of the rotating web rolls 96 and 97.

Following the operation of the web-severing means, the cam 278, shown in Fig. 12, operates through the bell-crank lever 279 and gear-wheel mechanism connected therewith to move the carriage 252 through its forward stroke, thereby advancing the pair of severed sheets until the front edges thereof extend under the accelerator roll 324 which has been previously raised by the cam 369 and connected mechanism shown in Figs. 31 and 32. During this movement of the sheets, the wrinkling or disalignment thereof is conveniently prevented by means of guiding strips 426, there being provided one pair of strips for each of the severed sheets. Each of these guiding strips is positioned in spaced relation to the sheet-supporting surface of the angularly-adjustable frame 32, so that a sheet may pass between it and said supporting surface, and it is mounted at its opposite ends as shown in Fig. 8. As therein illustrated, the front end of the strip has secured thereto an arm 427 which extends around the rock shaft 326 so as to be supported thereby. The rear end of the strip 426 is provided with a tail portion 428 and an upstanding portion 429 having a horizontal extension 430. The horizontal extension is positioned in a slot formed in a depending strip 431 carried by a member 432 adjustably mounted on the elongated knife-supporting member 243. In view of the adjustable mounting of the strips 426, the spacing of each pair may be increased or decreased in accordance with changes in the width of the sheets.

Following the forward movement of the pair of sheets by the carriage 252, the cam 369, shown in Fig. 31, permits the lowering of the accelerator roll 324 into engagement with the pair of sheets, while the cam 323 causes the raising of the sheet-actuating rods 253 and 253a. Next, the cam 362, shown in Fig. 11, through the bell-crank lever 364 and connected mechanism causes the turning of the accelerator roll 324, so that the severed sheets are advanced forwardly until the front edge thereof is positioned just out of the bite of the coils. The traverse cam 48 now causes the movement of one of the rods 353, shown in Fig. 13, into engagement with its adjacent gear-wheel sector 356, with the result that the drum 358 is turned so as to actuate the contact element 359 carried thereby into engagement with the co-acting stationary contact element 361. The electromagnet 351, shown in Fig. 7, is now energized, causing an exceedingly rapid movement of the crank arm 341 and, consequently, a correspondingly rapid movement of the accelerator roll 324. This movement of the accelerator roll 324 causes the actuation of the pair of sheets into the bite of the coils at a speed which is preferably equal to or slightly greater than the peripheral speed of said coils. This final injection of the pair of sheets is timed to occur when the traverse bar 32 reaches the end of its stroke.

At this time, the cam 387, shown in Fig. 13, through the mechanism connected therewith causes a momentary rotation of the traverse rod 34, with the result that an additional longitudinal movement is imparted to the traverse bar 29. Such movement occurring at each end of the traverse stroke increases the spacing between the turns of wire at the beginning and ending of a coil layer, thereby tending to prevent undesirable crossing of adjacent turns of wire.

It will be observed that, as the traverse bar 29 approaches the end of its stroke in each direction, the cam 381, shown in Figs. 28 and 29, operates to gradually slow down the spindle speed and thereafter to cause a gradual increase in the spindle speed to a predetermined maximum value as the traverse bar starts on its opposite stroke. This predetermined maximum value is progressively decreased throughout the operation of the machine due to the automatic adjustment of the brush mechanism 23 by the angularly-adjustable frame 32 through the linkage 403, 407 and 408.

Immediately following the injection of the pair of sheets into the coils by the accelerator roll 324 operating under the action of the electromagnet 351, the roll is raised by the cam 369. The cam 278, which controls the operation of the carriage 252, has now moved into a position permitting the weight 291 to actuate the carriage rearwardly until the arm 296 engages the cam 298. While the carriage 252 is moving rearwardly, the feed rolls 157 and 158 are being actuated by the weight 182 so as to feed forwardly the desired amount of web material, and this is followed by the dropping of the sheet-actuating rods 253 and 253a, and the operation of the web-severing means as previously set forth.

In the course of the operation of the machine, the cam stops 196 and 298 are moved bodily to the left step-by-step through the operation of the pawl-and-ratchet mechanism shown in Figs. 18 and 19 by the actuating shoulders 217 on the cam 216. Such intermittent movement automatically permits an increase in the stroke of the arm 194 and a decrease in the stroke of the arm 296, with the result that the length of the pair of sheets is progressively increased while the stroke of the carriage 252 is correspondingly decreased.

At the same time, the cam 216 through the pawl-and-ratchet mechanism shown in Figs. 18 and 19, the crank arm 271, the lever 262 and the vertical rod 256 causes the raising of the angularly-adjustable frame 32 step-by-step. Hence, the position of the frame 32 is automatically adjusted in accordance with the increase in diameter of the coils. However, this raising of the frame 32 results in a progressive increase in the spacing between the front edge of the frame and the point of tangency of the wires on the coils. This is automatically compensated for in the manner shown in Figs. 7 and 12, wherein it will be noted that the raising of the frame 32 results in a decrease in the effective lever arm of the gear-wheel sector 335. Since the extent of movement of the actuating arm 341 remains unchanged, it follows that the extent and rate of movement of the gear-wheel sector 335 and, consequently, the accelerator roll 324 is gradually increased throughout the operation of the machine, causing a corresponding increase in extent and rate of movement of the sheets of paper.

The foregoing cycle of operations is continued until coils of predetermined diameter have been formed, whereupon the machine is automatically brought to rest by the counter mechanism which operates to move the switch element 7 into its inner circuit-interrupting position, causing the de-energization of the driving motor 1. The spring-pressed lever 22 co-acting with the switch element 7 then moves upwardly into its solid-line holding position, preventing the return of the switch element 7 into its outer circuit-closing position upon the resetting of the counter mechanism. The machine may be started again by actuating the lever 22 manually or by the foot-pedal 8 so as to permit the movement of the switch element 7 into its outer circuit-closing position.

It will be noted that the invention may be variously modified and embodied within the scope of the subjoined claims.

I claim:

1. In a winding machine having a source of power, the combination with a winding spindle actuated thereby, of material-feeding means in operative relation to said spindle and actuated by said source of power, an independent source of power and mechanism associated therewith for actuating said material-feeding means at successively increasing speeds.

2. In a winding machine, a spindle, means for feeding a windable material into close proximity to said spindle at a predetermined speed, and electrically operated means for delivering said material to said spindle at increasingly higher rates of speed.

3. In a winding machine, a winding spindle, means for supplying thereto a windable material, means for accelerating the operation of said supply mechanism, and means for progressively varying the extent of operation of said accelerating mechanism.

4. In a winding machine, a winding spindle, means for supplying a windable material thereto, means for accelerating the operation of said supply mechanism, and means for varying the rate of operation of said acclerating mechanism.

5. In a winding machine, a spindle, means for winding material thereon including a feeding mechanism for delivering material to said spindle, and means for progressively increasing the extent and rate of operation of said feeding mechanism during at least a portion of the operation of the winding machine.

6. In a winding machine having severing means, a winding spindle, means for advancing a sheet of windable material from said severing means into proximity to said spindle, means for delivering said material to said spindle, and means for progressively increasing the speed of delivery of successive sheets to said spindle.

7. In a winding machine, a winding spindle, sheet-transfer means, means for adjusting the position of said sheet-transfer means, sheet-feeding means movable with said sheet-transfer means, actuating means for said sheet-feeding means for causing a rapid delivery of the sheet to said spindle, and means for varying the rate of feed of said sheet-feeding means in accordance with the position of said sheet-transfer means.

8. In a winding machine, an angularly-adjustable frame, sheet-feeding means associated therewith, a source of power, and means for operatively associating said sheet-feeding means and said source of power including a movable member having a lever arm the length of which varies with adjustments in the position of said frame.

9. In a winding machine, an angularly-adjustable frame, sheet-feeding means associated therewith, an electromagnet, and means for operatively associating said sheet-feeding means and said electromagnet comprising variable-leverage mechanism.

10. In a winding machine, an angularly-adjustable frame provided with sheet-feeding means, an electromagnet, variable-leverage means for operatively associating said sheet-feeding means and said electromagnet, and automatic means operated by said machine for periodically actuating said sheet-feeding means.

11. In a winding machine, an angularly-adjustable frame provided with sheet-feeding means, and actuating means for said sheet-feeding means comprising an actuating member, and a co-acting pivoted member mounted on said frame, the effective lever arm of one of said members being dependent upon the position of said frame.

12. In a winding machine, an angularly-adjustable frame provided with sheet-feeding means, and actuating means for said sheet-feeding means comprising a member pivotally mounted on said frame, a co-operating actuating member, an electromagnet connected to one of said members and an actuating cam connected to said actuating member.

13. In a winding machine, a winding spindle, sheet-transfer means for transferring sheets of varying length to said spindle comprising a reciprocatory carriage having a sheet-actuating stroke and a return stroke, and means for progressively decreasing the return stroke of said reciprocatory carriage in accordance with increase in the length of sheet fed.

14. In a winding machine, a feeding roll, means for actuating said roll in opposite directions, a control clutch therefor, and cam-operated means for rendering said clutch ineffective and for actuating said first-mentioned means in one direction while said clutch is ineffective.

15. In a winding machine, a feeding roll, means for actuating said roll in one direction comprising a weight, a clutch positioned between said weight and said roll, and automatic means for operating said clutch and moving said weight after each feeding operation of the roll.

16. In a winding machine, a pair of feeding rolls, means for actuating said rolls comprising a weight and connected gear-wheel mechanism, a clutch connected in said means between said weight and said rolls, and cam-actuated means operative on said clutch and said gear-wheel mechanism, whereby said clutch may be rendered ineffective and said weight raised.

17. In a winding machine, a pair of feeding rolls, actuating means therefor including a clutch and a source of power, means for rendering ineffective said clutch and for causing the storage of energy in said power source, a cam constituting a stop for said actuating means, and automatic means for periodically adjusting said cam, so that the extent of actuation of said feed rolls may be varied.

18. In a winding machine, feeding means including a feed roll, sheet-feeding means, and means for oppositely controlling the operation of said first- and second-mentioned means comprising a plurality of cams and means for moving said cams together, whereby the extent of operation of one of said feeding means is decreased while that of the other is increased.

19. In a winding machine, sheet-transfer means having a carriage, means including a feed roll, whereby sheets of windable material may be supplied to said sheet-transfer means, and a plurality of connected cams independently adjustable and bodily movable together for oppositely controlling the extent of operation of said carriage and said feed roll.

20. In a winding machine, the combination with means for feeding measured sheets of progressively increasing length, said means including a cam having an angular adjustment for controlling the increments of sheet-length, of sheet-transfer means having a movable carriage, and control means for said carriage including a cam having an angular adjustment for varying the decrements of carriage travel.

21. In a winding machine, a spindle, sheet-transfer means in operative relation to said spindle provided with an accelerating roll, means for successively operating said roll at different speeds, and means for bodily moving said roll so as to render the same ineffective.

22. In a winding machine, the combination with a rotatable support for a web roll, of braking means adapted to prevent the turning of said web roll, means for releasing said braking means and holding said braking means released, and means for drawing a supply of material from said roll while said braking means at the end of its drawing operation is released and resetting said braking means.

23. In a winding machine, means adapted to rotatably support a web roll, braking means for said roll, actuating means for said braking means movable into a position causing the release thereof, means for holding said actuating means in its brake-releasing position, and means for drawing a supply of material from said roll and rendering said holding means ineffective at the end of its drawing operation.

24. In a winding machine, means adapted to rotatably support a plurality of web rolls, separate braking means for said rolls, each of said braking means having operating means movable into a brake-releasing position and means for holding said operating means in said position, and means for drawing a supply of material from each of said rolls and for rendering said holding means ineffective at the end of its drawing operation.

25. In a winding machine, means adapted to rotatably support a plurality of rolls, separate braking means for said rolls, each of said braking means having operating means movable into a brake-releasing position, means for drawing a supply of material from each of said rolls and for rendering said operating means ineffective, and common actuating means for the plurality of operating means controlled by the machine.

26. In a winding machine, a rotatable support for a web roll having a spring-pressed brake, means for actuating said brake into an ineffective position, a latch for said actuating means, whereby said brake may be held in its ineffective position, and a draw bar adapted to render said latch ineffective when the desired supply of web material has been withdrawn from the roll.

27. In a winding machine having a web roll, a pair of brakes for said web roll, actuating means periodically operative on one of said brakes, and means for actuating the other of said brakes during at least a portion of the period of operation of the first mentioned means.

28. In a winding machine having a web roll, a pair of brakes for said web roll, actuating means, including an actuating cam, periodically operative on one of said brakes to render the same ineffective, and means operative on the other of said brakes to render the same effective during at least a portion of the actuating period of said cam.

29. In a coil-winding machine having a spindle and sheet-transfer means, means for moving said sheet transfer means as the coil being wound increases in diameter, means whereby a coil may be wound on said spindle, and means controlled by the movement of said sheet-transfer means, whereby the speed of the spindle may be decreased as the periphery of the coil increases.

30. In a coil-winding machine, a spindle, traverse mechanism in operative relation thereto comprising a member adapted to have movements of translation and of rotation, and means for imparting said movements to said member.

31. In a coil-winding machine, traverse mechanism comprising a member mounted for longitudinal and rotary movement, means for imparting a longitudinal movement to said member, and means whereby an additional longitudinal movement may be imparted to said member upon rotation thereof.

32. In a coil-winding machine, traverse mechanism comprising a longitudinally movable member having a threaded portion, a second member constituting a nut for said threaded portion, a gear-wheel having a splined connection to said longitudinally movable member, and a driving gear-wheel in mesh with said first-mentioned gear-wheel, whereby the longitudinally movable member may be turned in said nut and an additional longitudinal movement thereby imparted thereto.

33. In a coil-winding machine, a reciprocatory wire guide comprising a longitudinally and rotatably movable member having a threaded portion, a nut for said threaded portion, and a pivoted actuating member for said longitudinally movable member connected to said nut.

34. In a coil-winding machine, traverse mechanism comprising a member mounted for longitudinal and rotary movement, means for imparting a longitudinal movement to said member, means whereby additional longitudinal movement may be imparted to said member upon a rotary movement thereof, and means for adjusting the extent of said additional longitudinal movement.

35. The combination in a winding machine of a winding spindle, mechanism for supplying sheets of different dimensions to said spindle including means for feeding sheet material, means for cutting said material into sheets of predetermined size, a sheet-transfer mechanism for feeding the severed sheets, means for delivering said sheets to said spindle, and mechanism for increasing the extent of operation of said feeding mechanism and proportionately decreasing the extent of movement of said transfer mechanism.

36. The combination in a winding machine of a winding spindle, means for supplying sheets of varying length for delivery to said spindle including a sheet-transfer mechanism and means for decreasing the extent of movement of said transfer mechanism in proportion to the increase in length of said sheets.

37. The combination in a winding machine of a winding spindle, means for supplying sheets of gradually increasing length to said spindle including a reciprocable sheet-transfer carriage and means for decreasing the extent of movement of said carriage in accordance with the increase in length of successive sheets.

38. In a coil winding machine, a winding spindle, means for delivering wire thereto to be wound in layers thereon, mechanism for feeding sheet material thereto, means for adjusting the position of said sheet feeding mechanism relatively to said spindle as the coil being wound increases in diameter, and means for varying the speed of operation of said mechanism in accordance with the position thereof.

39. In a coil winding machine, a winding spindle, means for delivering wire thereto to be wound in layers thereon, mechanism for feeding sheet material thereto, means for adjusting the position of said sheet feeding mechanism relatively to said spindle as the coil being wound increases in diameter and means operated by said adjustment for varying the speed of operation of said sheet feeding mechanism.

40. The combination in a coil winding machine, of means for winding superposed layers of wire thereon, means for delivering sheets of insulating material to said spindle between said layers of wire including mechanism for ejecting successive sheets to said spindle, a movable table supporting said ejecting mechanism, and means controlled by the movement of said table for progressively increasing the speed of operation of said ejecting mechanism.

41. The combination in a coil winding machine, of means for winding superposed layers of wire thereon, means for delivering sheets of successively increased length to said spindle between said layers of wire including mechanism for ejecting successive sheets to said spindle, a movable table supporting said sheet delivering means, and means controlled by the movement of said table for progressively increasing the speed of operation of said ejecting mechanism.

42. The combination in a coil winding machine of a winding spindle, means for delivering sheets of insulating material of progressively increasing length to said spindle including sheet feeding rollers, a driving gear for said rollers, an oscillating segment for operating said gear, a cam for actuating said segment and a clutch located between said gear and said rollers for transmitting the movement of said segment to said rollers in one direction only.

43. The combination in a coil winding machine of a winding spindle, means for delivering sheets of insulating material of progressively increasing length to said spindle including sheet feeding rollers, a driving gear for said rollers, an oscillating segment for operating said gear, a cam for actuating said segment, means for limiting the extent of movement of said segment, means for automatically shifting said limiting means to increase the length of effective operation of said segment, and a clutch located between said gear and said rollers for transmitting the movement of said segment to said rollers in one direction only.

AUGUSTE L. SALTZMAN.

CERTIFICATE OF CORRECTION.

Patent No. 1,955,764. April 24, 1934.

AUGUSTE L. SALTZMAN.

It is hereby certified that error appears in the printed specification of the above numbered patent requiring correction as follows: Page 14, lines 147 and 148, claim 22, strike out the words "at the end of its drawing operation" and insert the same after "means" in line 149; and that the said Letters Patent should be read with this correction therein that the same may conform to the record of the case in the Patent Office.

Signed and sealed this 29th day of May, A. D. 1934.

Bryan M. Battey (Seal) Acting Commissioner of Patents.

chine, of means for winding superposed layers of wire thereon, means for delivering sheets of successively increased length to said spindle between said layers of wire including mechanism for ejecting successive sheets to said spindle, a movable table supporting said sheet delivering means, and means controlled by the movement of said table for progressively increasing the speed of operation of said ejecting mechanism.

42. The combination in a coil winding machine of a winding spindle, means for delivering sheets of insulating material of progressively increasing length to said spindle including sheet feeding rollers, a driving gear for said rollers, an oscillating segment for operating said gear, a cam for actuating said segment and a clutch located between said gear and said rollers for transmitting the movement of said segment to said rollers in one direction only.

43. The combination in a coil winding machine of a winding spindle, means for delivering sheets of insulating material of progressively increasing length to said spindle including sheet feeding rollers, a driving gear for said rollers, an oscillating segment for operating said gear, a cam for actuating said segment, means for limiting the extent of movement of said segment, means for automatically shifting said limiting means to increase the length of effective operation of said segment, and a clutch located between said gear and said rollers for transmitting the movement of said segment to said rollers in one direction only.

AUGUSTE L. SALTZMAN.

CERTIFICATE OF CORRECTION.

Patent No. 1,955,764.      April 24, 1934.

AUGUSTE L. SALTZMAN.

It is hereby certified that error appears in the printed specification of the above numbered patent requiring correction as follows: Page 14, lines 147 and 148, claim 22, strike out the words "at the end of its drawing operation" and insert the same after "means" in line 149; and that the said Letters Patent should be read with this correction therein that the same may conform to the record of the case in the Patent Office.

Signed and sealed this 29th day of May, A. D. 1934.

Bryan M. Battey (Seal)      Acting Commissioner of Patents.